(12) United States Patent
Kuwatani et al.

(10) Patent No.: US 9,561,980 B2
(45) Date of Patent: Feb. 7, 2017

(54) OPTICAL GLASS, OPTICAL GLASS BLANK, GLASS MATERIAL FOR PRESS MOLDING, OPTICAL ELEMENT, AND METHODS FOR PRODUCING THEM

(71) Applicant: HOYA CORPORATION, Shinjuku-ku, Tokyo (JP)

(72) Inventors: Shungo Kuwatani, Tokyo (JP); Yasuhiro Fujiwara, Tokyo (JP)

(73) Assignee: HOYA CORPORATION, Tokyo (JP)

( * ) Notice: Subject to any disclaimer, the term of this patent is extended or adjusted under 35 U.S.C. 154(b) by 0 days.

(21) Appl. No.: 14/767,322

(22) PCT Filed: Feb. 19, 2014

(86) PCT No.: PCT/JP2014/053945
§ 371 (c)(1),
(2) Date: Aug. 12, 2015

(87) PCT Pub. No.: WO2014/129510
PCT Pub. Date: Aug. 28, 2014

(65) Prior Publication Data
US 2015/0368151 A1    Dec. 24, 2015

(30) Foreign Application Priority Data

Feb. 19, 2013 (JP) ................ 2013-030211
Feb. 19, 2013 (JP) ................ 2013-030212
Sep. 30, 2013 (JP) ................ 2013-205432
Jan. 14, 2014 (JP) ................ 2014-004423

(51) Int. Cl.
| C03C 3/21 | (2006.01) |
| C03C 3/064 | (2006.01) |
| C03B 23/00 | (2006.01) |
| C03B 11/08 | (2006.01) |
| C03B 19/02 | (2006.01) |

(52) U.S. Cl.
CPC ............ C03C 3/21 (2013.01); C03C 3/064 (2013.01); C03B 11/08 (2013.01); C03B 19/02 (2013.01)

(58) Field of Classification Search
CPC ............ C03C 3/19; C03C 3/21; C03C 3/064; C03B 23/0013; G02B 27/0025
See application file for complete search history.

(56) References Cited

U.S. PATENT DOCUMENTS

2005/0032621 A1*  2/2005  Zou ............... C03C 3/062
                                                          501/46
2008/0305939 A1  12/2008  Oogaki

FOREIGN PATENT DOCUMENTS

| JP | S61-146732 A | 7/1986 |
| JP | H05-270853 A | 10/1993 |
| JP | H06-345481 A | 12/1994 |
| JP | H08-157231 A | 6/1996 |
| JP | 2003-160355 A | 6/2003 |
| JP | 2003-238197 A | 8/2003 |
| JP | 2008-303112 A | 12/2008 |
| JP | 2009-096649 A | 5/2009 |
| JP | 2010-260740 A | 11/2010 |
| JP | 2011-136884 A | 7/2011 |
| JP | 2012-017261 A | 1/2012 |

OTHER PUBLICATIONS

Machine Translation of JP 2011-136884, Jul. 14, 2011.*
May 27, 2014 International Search Report issued in International Patent Application No. PCT/JP2014/053945.
Sep. 3, 2015 International Preliminary Report on Patentability issued in International Patent Application No. PCT/JP2014/053945.
May 27, 2014 Written Opinion issued in International Patent Application No. PCT/JP2014/053945.

* cited by examiner

*Primary Examiner* — Elizabeth A Bolden
(74) *Attorney, Agent, or Firm* — Oliff PLC

(57) ABSTRACT

An aspect of the present invention relates to optical glass, wherein, in a glass composition based on oxides, a content of $P_2O_5$ is in the range of 20~34 weight %; a content of $B_2O_3$ is over 0 weight % but 10 weight % or less; a weight ratio ($B_2O_3/P_2O_5$) is over 0 but less than 0.39; a weight ratio $[TiO_2/(TiO_2+Nb_2O_5+WO_3+Bi_2O_3+Ta_2O_5)]$ is in the range of 0.059~0.180; and a weight ratio $[(P_2O_5+B_2O_3+SiO_2)/(Na_2O+K_2O+Li_2O)]$ is in the range of 1.39~1.80, the optical glass having a refractive index nd of 1.78~1.83, and an Abbe's number vd of 20~25.

34 Claims, No Drawings

OPTICAL GLASS, OPTICAL GLASS BLANK, GLASS MATERIAL FOR PRESS MOLDING, OPTICAL ELEMENT, AND METHODS FOR PRODUCING THEM

CROSS REFERENCES TO RELATED APPLICATIONS

The present application claims the priorities of Japanese patent application No. 2013-030211 and Japanese patent application No. 2013-030212 filed on Feb. 19, 2013, Japanese patent application No. 2013-205432 filed on Sep. 30, 2013, and Japanese patent application No. 2014-004423 filed on Jan. 14, 2014, the contents of which are particularly introduced herein by references in their entirety.

FIELD OF THE INVENTION

The present invention relates to an optical glass, an optical glass blank, a glass material for press molding, an optical element, and methods for producing them. Specifically, it relates to a phosphate-based optical glass having high refractive index and high dispersion characteristics with excellent resistance to devitrification, an optical glass blank, a glass material for press molding, an optical element, each of which is comprised of this optical glass, as well as methods for producing them.

DESCRIPTION OF RELATED ART

Optical glasses with a variety of refractive indexes as described in Patent Documents 1 to 8, are known as a so-called phosphate-based optical glass containing much phosphate as a network former of glass. Among them, an optical glass having both high refractive index and high dispersion characteristics (low Abbe's number) is in high demand as optical element material such as various lenses, etc. For example, it can be combined with a lens of high refractive index and low dispersion to construct a compact and high functional optical system for correcting a chromatic aberration. Further, aspherization of an optical functional surface of a lens with high refractive index and high dispersion characteristics allows various optical systems to be highly functionalized and compacted all the more.

CITATION LIST

Patent Document (Patent Document 1) laid open Japanese patent application No. H1993-270853
(Patent Document 2) laid open Japanese patent application No. H1994-345481
(Patent Document 3) laid open Japanese patent application No. H1996-157231
(Patent Document 4) laid open Japanese patent application No. 2003-238197
(Patent Document 5) laid open Japanese patent application No. 2003-160355
(Patent Document 6) laid open Japanese patent application No. 2008-303112
(Patent Document 7) laid open Japanese patent application No. 2009-96649
(Patent Document 8) laid open Japanese patent application No. 2012-17261

SUMMARY OF THE INVENTION

However, as a method for producing an optical element such as lens, etc. a method for producing an optical element by making a semi-final product called an optical element blank with an approximate shape to that of an optical element and then subjecting this semi-final product to grinding and polishing processes is known. In an aspect of a method for producing such semi-final product, there is a method for producing a semi-final product by press molding an appropriate amount of molten glass (referred to as a direct press method). Further, in another aspect, there are a method for producing a semi-final product by injecting molten glass into a mold to mold the molten glass into a glass plate, cutting this glass plate into a plurality of glass pieces, reheating this glass pieces to be softened, and press molding the soften glass pieces, and an method for obtaining a semi-final product by molding appropriate amount of molten glass into a globe of glass called a glass gob, barrel polishing this globe of glass, followed by reheating the barrel polished globe of glass to be softened, and press molding the softened globe of glass, etc. Compared with the direct press method, a method of reheating the glass to be softened and press molding the softened glass is referred to as a reheat press method.

Further, as a method for producing an optical element, a method for obtaining an optical element by producing a glass material for press molding from molten glass, and precision press molding this glass material for press molding with a mold (referred to as precision press molding method) is also known. In the precision press molding method, by transferring a shape of a molding surface of a mold, an optical functional surface of optical element can be formed, without being subjected to machining such as polishing, grinding, etc.

In any of the direct press method, the reheat press method, and the precision press molding method as described above, it would be difficult to obtain an optical element with an excellent transparency, if a crystal is precipitated in glass in the manufacturing process. For that reason, an optical glass with suppressed crystal precipitation, i.e., high resistance to devitrification is required.

However, an optical glass of a composition with contents of a high refractive index-imparting component and a high dispersion-imparting component as well as much phosphate as a network former of glass generally has a strong tendency to get devitrified. For that reason, it has conventionally been difficult to improve resistance to devitrification in a phosphate-based optical glass having a high refractive index and high dispersion characteristics.

An aspect of the present invention provides a phosphate-based optical glass having excellent resistance to devitrification as well as having the high refractive index and high dispersion characteristics.

Further, according to an aspect of the present invention, an optical glass blank, a glass material for press molding, an optical element, each of which is comprised of the above-described optical glass, as well as methods for producing them are provided.

An aspect of the present invention (hereinafter, referred to as "Aspect 1") relates to an optical glass, wherein, in a glass composition based on oxides, a content of $P_2O_5$ is in the range of 20~34 weight %;
a content of $B_2O_3$ is over 0 weight % but 10 weight % or less;
a weight ratio ($B_2O_3/P_2O_5$) is over 0 but less than 0.39;
a weight ratio [$TiO_2/(TiO_2+Nb_2O_5+WO_3+Bi_2O_3+Ta_2O_5)$] is in the range of 0.059~0.180; and
a weight ratio [$(P_2O_5+B_2O_3+SiO_2)/(Na_2O+K_2O+Li_2O)$] is in the range of 1.39~1.80,
the optical glass having a refractive index nd of 1.78~1.83, and an Abbe's number vd of 20~25.

An Optical glass according to Aspect 1 is a phosphate-based optical glass comprising $P_2O_5$ as essential components, which additionally comprises $B_2O_3$ and $TiO_2$ as essential components, and further satisfies the above-described contents and weight ratios so that it can exhibit excellent resistance to devitrification as well as having the high refractive index and high dispersion characteristics as a refractive index nd of 1.78~1.83, and an Abbe's number vd of 20~25.

Further, an optical glass according to an aspect of the present invention (hereinafter, referred to as "Aspect 2") includes, an optical glass, wherein, in a glass composition based on oxides, $P_2O_5$, $B_2O_3$ and $TiO_2$ are essential components, and $SiO_2$, $Li_2O$, $Nb_2O_5$, $WO_3$, $Bi_2O_3$, and $Ta_2O_5$ are optional components;

a content of $P_2O_5$ is in the range of 20~34 weight %;
a content of $B_2O_3$ is over 0 weight % but 10 weight % or less;
a content of $Li_2O$ is 0 weight % or more but less than 0.3 weight %;
a weight ratio ($B_2O_3/P_2O_5$) is over 0 but less than 0.39;
a weight ratio [$(P_2O_5+B_2O_3)/(TiO_2+Nb_2O_5+WO_3+Bi_2O_3+Ta_2O_5)$] is over 0.53; and
a weight ratio [$TiO_2/(TiO_2+Nb_2O_5+WO_3+Bi_2O_3+Ta_2O_5)$] is in the range of 0.059~0.96,
the optical glass having a refractive index nd of 1.78~1.83, and an Abbe's number vd of 20~25 (hereinafter, referred to as "Glass 2-A"); and an optical glass, wherein, in a glass composition based on oxides, $P_2O_5$, $B_2O_3$ and $TiO_2$ are essential components, and $SiO_2$, $Li_2O$, $Nb_2O_5$, $WO_3$, $Bi_2O_3$, and $Ta_2O_5$ are optional components;

a content of $P_2O_5$ is in the range of 20~34 weight %;
a content of $B_2O_3$ is over 0 weight % but 10 weight % or less;
a content of $Li_2O$ is 0 weight % or more but less than 0.3 weight %;
a weight ratio ($B_2O_3/P_2O_5$) is over 0 but less than 0.39;
a weight ratio [$(P_2O_5+B_2O_3+SiO_2)/(TiO_2+Nb_2O_5+WO_3+Bi_2O_3+Ta_2O_5)$] is over 0.53;
a weight ratio [$SiO_2/(SiO_2+P_2O_5+B_2O_3)$] is less than 0.02; and
a weight ratio [$TiO_2/(TiO_2+Nb_2O_5+WO_3+Bi_2O_3+Ta_2O_5)$] is in the range of 0.059~0.96,
the optical glass having a refractive index nd of 1.78~1.83, and an Abbe's number vd of 20~25 (hereinafter, referred to as "Glass 2-B").

The above-described Glass 2-A and Glass 2-B contain $P_2O_5$, $B_2O_3$ and $TiO_2$ as essential components, and can optionally contain $SiO_2$, $Li_2O$, $Nb_2O_5$, $WO_3$, $Bi_2O_3$, and $Ta_2O_5$. Also, by satisfying above-described contents and weight ratios, the phosphate-based optical glass exhibiting excellent resistance to devitrification as well as having the high refractive index and high dispersion characteristics as a refractive index nd of 1.78~1.83, and an Abbe's number vd of 20~25 can be obtained.

According to Aspects 1 and 2, it is possible to provide a phosphate-based optical glass having the high refractive index and high dispersion characteristics preferable for any of the direct press method, the reheat press method and the precision press molding method. According to a further aspect of the present invention, an optical glass blank, a glass material for press molding, and an optical element, each of which is comprised of the above-described optical glass, are provided.

However, the above-described precision press molding method is a method which can efficiently fabricate an optical element such as an aspheric lens, etc. Therefore, it is preferable for the above-described phosphate-based optical glass to have properties suitable for precision press molding (good precision press moldability) as well as a high refractive index and high dispersion characteristics in order to fabricate an optical element such as an aspheric lens, etc. with good productivity.

Accordingly, an aspect of the present invention provides a phosphate-based optical glass preferable for precision press molding as well as having a high refractive index and high dispersion characteristics.

Further, according to an aspect of the present invention, a preform for precision press molding, and an optical element, each of which comprised of the above-described optical glass, as well as a method for producing an optical element by precision-press molding this preform for precision press molding, are provided.

An aspect of the present invention (hereinafter, referred to as "Aspect 3") relates to an optical glass comprising, in a glass composition based on oxides, 24~34 weight % of $P_2O_5$;
over 0 weight % but 4 weight % or less of $B_2O_3$;
12~20 weight % of a total of $Na_2O$, $K_2O$, and $Li_2O$;
15~30 weight % of $Nb_2O_5$;
8~15 weight % of $TiO_2$; and,
4~25 weight % of $Bi_2O_3$,
wherein a weight ratio ($TiO_2/Nb_2O_5$) is in the range of 0.36~1.00, and
a weight ratio ($Bi_2O_3/Nb_2O_5$) is in the range of 0.16~1.67,
the optical glass having a refractive index nd of 1.78 or greater but less than 1.83, and an Abbe's number vd of 20~25.

The Optical glass according to Aspect 3 has defined a ratio of $TiO_2$ and $Nb_2O_5$ as components useful for imparting a high refractive index and high dispersion characteristics to the optical glass, and a ratio of $Bi_2O_3$ and $Nb_2O_5$ as components capable of imparting good precision press moldability to the optical glass, as well as containing, as essential components, $P_2O_5$, $B_2O_3$, $Nb_2O_5$, $TiO_2$, $Bi_2O_3$, and alkali metal oxide (one or more selected from the group consisting of $Na_2O$, $K_2O$, and $Li_2O$). In this way, it is possible to obtain a phosphate-based optical glass preferable for precision press molding as well as having a high refractive index and high dispersion characteristics as a refractive index nd of 1.78 or greater but less than 1.83, and an Abbe's number vd of 20~25.

According to Aspect 3, it is possible to provide a phosphate-based optical glass having a high refractive index and high dispersion characteristics preferable for obtaining a preform for precision press molding. According to a further aspect of the present invention, a preform for precision press molding and an optical element comprised of the above-described optical glass are also provided.

DETAILED DESCRIPTION OF EXEMPLARY EMBODIMENTS

Optical Glass

As described previously, in the present invention, a glass composition of the optical glass is denoted based on oxides. Here, the term "glass composition based on oxides" refers to the glass composition obtained by conversion of the glass starting materials by full decomposing during melting so as to be present in the form of oxides in optical glass. Further, unless specifically indicated otherwise, the glass composition is assumed to be deonoted based on weight.

The glass composition in the present invention is one obtained by ICP-AES (Inductively Coupled Plasma—Atomic Emission Spectrometry). Furthermore, the analysis value obtained by the present analysis method includes a measurement error in the order of ±5%.

Further, as used in the present specification and the present invention, "a content of a component is 0%" means "this component is substantially not contained", and refers to "the content of this component is in the order of a level of impurities or less".

The following will describe Aspect 1, Aspect 2, and Aspect 3. Unless specifically described, the description with respect to any aspect is also applicable to other aspects. Further, an optical glass corresponding to any two or more of Aspects 1 to 3 is included in an optical glass according to an aspect of the present invention.

<Aspect 1>

An optical glass according to Aspect 1 is an optical glass, wherein, in a glass composition based on oxides, a content of $P_2O_5$ is in the range of 20~34 weight %; a content of $B_2O_3$ is over 0 weight % but 10 weight % or less; a weight ratio $(B_2O_3/P_2O_5)$ is over 0 but less than 0.39; a weight ratio $[TiO_2/(TiO_2+Nb_2O_5+WO_3+Bi_2O_3+Ta_2O_5)]$ is in the range of 0.059~0.180; and a weight ratio $[(P_2O_5+B_2O_3+SiO_2)/(Na_2O+K_2O+Li_2O)]$ is in the range of 1.39~1.80, the optical glass having a refractive index nd of 1.78~1.83, and an Abbe's number vd of 20~25.

The following will describe details thereof.

$P_2O_5$ is an inevitable component as a glass-forming component in a phosphate-based optical glass. The phosphate-based optical glass is characterized in that the glass can be melted at a relatively low temperature and has a high transmittance in the visible range. From a viewpoint of the improvement in the resistance to devitrification of the glass, the lower limit of a content of $P_2O_5$ is 20% or more, and preferably 21% or more. Also, the upper limit thereof is 34% or less, preferably 30% or less, and more preferably 24% or less.

$B_2O_3$ is a component having the effect of increasing the resistance to devitrification by addition of an appropriate amount to the phosphate-based optical glass. For that reason, it is introduced over 0% as an essential component into the above-described optical glass. The content of $B_2O_3$ is preferably 2% or more, and more preferably 6% or more. Provided that it is contained in an excessive amount, it is difficult to realize the high refractive index and high dispersion characteristics, and therefore its content is set to be 10% or less. Its content is set to be preferably 9% or less, and more preferably 8% or less.

Here, "a content of $B_2O_3$ is 0%" comprises the case where a trace amount of $B_2O_3$ is contained in the order of a level of impurities in glass. Therefore, "a content of $B_2O_3$ is over 0%" refers to the case where $B_2O_3$ is contained over the order of this level of impurities. Specifically, its examples includes 700 ppm or more (weight ratio), or 1000 ppm or more (weight ratio).

The content of each of $P_2O_5$ and $B_2O_3$ is the same as described previously. Further, in the above-described optical glass, a weight ratio of $P_2O_5$ content and $B_2O_3$ content $(B_2O_3/P_2O_5)$ is set to over 0 but less than 0.39 in order to increase the resistance to devitrification of the phosphate-based optical glass with the high refractive index and high dispersion characteristics. More preferable lower limit thereof is 0.15, and much more preferable lower limit thereof is 0.25. More preferable upper limit thereof is 0.38.

$SiO_2$ is an optional component which may be contained in the above-described optical glass. From a viewpoint of increasing the refractive index, it is contained in an amount of preferably 2% or less, more preferably 1.2% or less, much more preferably 1.0% or less, still much more preferably 0.4% or less, even still much more preferably 0.3% or less, and most preferably less than 0.3%, and it may not be introduced at all (a content of $SiO_2$ may be 0%).

Further, from a viewpoint of an improvement in the resistance to devitrification and meltability, a weight ratio of $SiO_2$ content to a total content of $SiO_2$, $P_2O_5$ and $B_2O_3$ $[SiO_2/(SiO_2+P_2O_5+B_2O_3)]$ is preferably 0.12 or less, and more preferably in the range of 0~0.04.

The above-described optical glass contains, as essential components, one or more of alkali metal oxides selected from the group consisting of $Li_2O$, $Na_2O$ and $K_2O$. By defining an amount of (a total content in case of containing two or more of) these alkali metal oxides with respect to the total content of $P_2O_5$, $B_2O_3$ and $SiO_2$, a high refractive index and high dispersion phosphate-based optical glass exhibiting excellent resistance to devitrification can be obtained. Specifically, in the above-described optical glass, a weight ratio of a total content of $P_2O_5$, $B_2O_3$ and $SiO_2$ to a total content of $Li_2O$, $Na_2O$ and $K_2O$ $[(P_2O_5+B_2O_3+SiO_2)/(Na_2O+K_2O+Li_2O)]$ is in the range of 1.39~1.80. If this weight ratio is below 1.39, it would be difficult to maintain the resistance to devitrification. The weight ratio $[(P_2O_5+B_2O_3+SiO_2)/$ ($Na_2O+K_2O+Li_2O$)] is preferably 1.40 or more, more preferably 1.42 or more, much more preferably 1.43 or more, and still much more preferably 1.45 or more. On the other hand, from a viewpoint of maintaining the high refractive index and high dispersion characteristics, a weight ratio [($P_2O_5+B_2O_3+SiO_2$)/($Na_2O+K_2O+Li_2O$)] is preferably 1.67 or less, and more preferably 1.60 or less.

From a viewpoint of an improvement in the resistance to devitrification, if the above-described optical glass contains $Li_2O$, a content of $Li_2O$ is preferably less than 0.3%. More preferably, the content thereof is 0.2% or less. From a viewpoint of a further improvement in resistance to devitrification, it is preferable that $Li_2O$ be not contained (a content of $Li_2O$ be 0%). From the same viewpoint, it is preferable to suppress a content of $Li_2O$ relative to a total content of alkali metal oxides. Specifically, a weight ratio [$Li_2O$/($Na_2O+K_2O+Li_2O$)] is preferably less than 0.0115, and more preferably 0.003 or less.

At least one, preferably at least $Na_2O$, and more preferably both of $Na_2O$ and $K_2O$ of other alkali metal oxides can be added to the above-described glass. From a viewpoint of suppressing a decline in refractive index, a weight ratio $K_2O/Na_2O$ of $K_2O$ content to $Na_2O$ content is preferably 0.52 or less, and more preferably 0.40 or less. Further, a weight ratio $K_2O/Na_2O$ can be 0.20 or more, for example.

Furthermore, a content of $Na_2O$ can be 0% or more, preferably 8% or more, and more preferably 11% or more. A content of $K_2O$ can be 0% or more, preferably 2% or more, and more preferably 3% or more.

From a viewpoint of the resistance to devitrification, a content of $Na_2O$ of the above-described optical glass can be 16% or less, preferably 15% or less, and more preferably 14% or less. From the same viewpoint, a content of $K_2O$ is preferably 6% or less, and more preferably 5% or less.

A content of (a total content in case of containing a plurality of) alkali metal oxides is preferably 10% or more, and from a viewpoint of maintaining the resistance to devitrification, preferably 30% or less, and more preferably 20% or less. A preferable lower limit thereof is 15%.

$TiO_2$ is a component capable of imparting a high refractive index and high dispersion characteristics to the glass by addition of an appropriate amount, and is introduced as essential component to the above-described optical glass. However, in order to maintain the high refractive index and high dispersion characteristics and the resistance to devitrification, the content thereof relative to contents of $Nb_2O_5$, $WO_3$, $Bi_2O_3$, $Ta_2O_5$ as other components capable of imparting the high refractive index and high dispersion characteristics is set to be an amount such that a weight ratio of $TiO_2$ content to a total content of $TiO_2$, $Nb_2O_5$, $WO_3$, $Bi_2O_3$, and $Ta_2O$ [$TiO_2$/($TiO_2+Nb_2O_5+WO_3+Bi_2O_3+Ta_2O_5$)] is in the range of 0.059~0.180. If this weight ratio is below 0.059, it is difficult to obtain the high refractive index and high dispersion characteristics as described above. Further, from a viewpoint of suppressing the coloring, the upper limit thereof is set to 0.180. For the weight ratio [$TiO_2$/($TiO_2+Nb_2O_5+WO_3+Bi_2O_3+Ta_2O_5$)], the lower limit thereof is preferably 0.10 or more, and more preferably 0.12 or more. The upper limit thereof is preferably 0.178 or less, more preferably 0.170 or less, and much more preferably 0.135 or less. From a viewpoint of the high refractive index and high dispersion characteristics, a content of $TiO_2$ is more preferably 6% or more. Further, from a viewpoint of maintaining the meltability of the glass and suppressing the coloring, it is preferably 11% or less, and more preferably 9% or less.

Further, in the above-described optical glass, from a viewpoint of the improvement in the resistance to devitrification, a total content of $P_2O_5$, $B_2O_3$ and $SiO_2$, relative to a total content of $TiO_2$, $Nb_2O_5$, $WO_3$, $Bi_2O_3$ and $Ta_2O_5$ as components imparting the high refractive index and high dispersion characteristics, is set to be an amount such that a weight ratio [($P_2O_5+B_2O_3+SiO_2$)/($TiO_2+Nb_2O_5+Bi_2O_3+Ta_2O_5$)] is preferably 0.49 or more, more preferably 0.51 or more, and much more preferably 0.52 or more. Further, from a viewpoint of maintaining the high refractive index and high dispersion characteristics, a weight ratio [($P_2O_5+B_2O_3$)/($TiO_2+Nb_2O_5+Bi_2O_3+Ta_2O_5$)] is preferably set to be 0.58 or less.

The total content of $TiO_2$, $Nb_2O_5$, $WO_3$, $Bi_2O_3$, and $Ta_2O_5$ as described above is preferably over 47%, and more preferably 50% or more, from a viewpoint of increasing the refractive index. Further, from a viewpoint of stability of the glass, a total content of $TiO_2$, $Nb_2O_5$, $WO_3$, $Bi_2O_3$, and $Ta_2O_5$ is preferably 60% or less, and more preferably 55% or less.

$Nb_2O_5$ is not only a component useful for obtaining the high refractive index and high dispersion characteristics, but also a component having the effect of increasing durability. From a viewpoint of maintaining the resistance to devitrification and suppressing the coloring, a content of $Nb_2O_5$ is preferably 47% or less. On the other hand, from a viewpoint of maintaining the high refractive index and high dispersion characteristics, a content of $Nb_2O_5$ is preferably 19% or more, more preferably 40% or more, and much more preferably 43% or more.

$WO_3$ and $Bi_2O_3$ are components which can be added in order to obtain the high refractive index and high dispersion characteristics. For example, each of a content of $WO_3$ and a content of $Bi_2O_3$ in the above-described optical glass can be set to be 15% or less. From a viewpoint of suppressing the coloring, each of the content of $WO_3$ and the content of $Bi_2O_3$ is set to preferably 12% or less, and preferably 6% or less and may be set to 0%. Further, the upper limit of $WO_3$ is preferably less than 13%, more preferably less than 3%, and much more preferably 2% or less.

$Ta_2O_5$ is an optional component which can be added in order to adjust a refractive index. For example, the content thereof can be set to be in the range of 0~2%. Preferably, the upper limit value of the content of $Ta_2O_5$ is less than 2%.

In the above-described optical glass, one, or two or more of alkali earth metal oxides MgO, CaO, SrO and BaO may be contained. For example, a total content of MgO, CaO, SrO and BaO can be set to be in the range of 0~10%. Since alkali earth metal oxides are components having the effect of increasing the stability of the glass, but they may cause the lowering of refractive index or lowering of dispersion, the total content thereof is preferably suppressed to 2% or less and may be 0%.

Further, for a content of each of alkali earth metal oxides, a preferable lower limit value of MgO content is 0% or more, and a preferable upper limit value thereof is 5% or less. A preferable lower limit value of a content of CaO is 0% or more, and a preferable upper limit value thereof is less than 1%. A preferable lower limit value of a content of SrO is 0% or more, and a preferable upper limit value thereof is 5% or less. A preferable lower limit value of a content of BaO is 0% or more, and a preferable upper limit value thereof is less than 7%, and more preferably 6% or less.

In the above-described optical glass, ZnO, and $Al_2O_3$ can be added as further optional components in order to adjust the refractive index. A content of ZnO can be preferably set to be less than 5%, and may be 0%. On the other hand, a content of $Al_2O_3$ is preferably set to be less than 3%, and more preferably 2% or less, and may be 0%. Further, for example, each of components such as $La_2O_3$, $Y_2O_3$, $Gd_2O_3$, $Cs_2O$, $ZrO_2$, PbO, and the like may be added in an amount of 0~1% without hindering the object of the present invention. However, since PbO is a component which it is required to refrain from using in consideration of its effects on the environment, it is preferable that PbO be not introduced at all. Also, F may be added in an amount of 2% or less, and preferably in an amount of less than 2%, based on the oxides. From a viewpoint of obtaining a homogeneous glass, it is preferable that F be not introduced at all. Further, $Sb_2O_3$ may be added to the above-described optical glass, for example, in an amount of 0~0.1%, as a quantity added as a ratio of the content of $Sb_2O_3$ to the total content other than $Sb_2O_3$. The quantity added as a ratio of the content of $Sb_2O_3$ to the total content other than $Sb_2O_3$ is preferably in the range of 0~0.02%, from a viewpoint of preventing the coloring.

The foregoing has described the glass composition of the above-described optical glass. The following will describe the glass properties of the above-described optical glass.

The above-described optical glass is a high refractive index and high dispersion optical glass having a refractive index nd of 1.78~1.83, and an Abbe's number vd of 20~25. A lower limit of the refractive index nd is preferably 1.790 or more, and more preferably 1.800 or more, and an upper limit thereof is preferably less than 1.820, and more preferably 1.815 or less. A lower limit of the Abbe's number vd is preferably 21 or more, and more preferably 22 or more, and an upper limit thereof is preferably 24 or less, and more preferably 23 or less. The optical glass having the refractive index nd and the Abbe's number vd as described above is useful in optical systems.

The above-described optical glass is an optical glass having a high refractive index and high dispersion characteristics, which can exhibit the excellent resistance to devitrification. One of the indexes of the resistance to devitrification can be a liquidus temperature. The above-described optical glass can exhibit, for example, the liquidus temperature of 1050° C. or less, and may exhibit the liquidus temperature of 1000° C. or less. Also, a lower limit of the liquidus temperature of the above-described optical glass is, for example, 900° C. or more, but is not specifically limited thereto.

Since the glass with a low liquidus temperature has high stability against devitrification at around a softening point, crystals can be prevented from precipitating in the glass during heating for the reheat press, or heating in the precision press molding. Further, since the glass with a low liquidus temperature can be caused to flow out at a low temperature, the temperature at which the molten glass is caused to flow out can be lowered. By way of lowering the temperature here, it is possible to prevent crystal from precipitating in the glass during producing an optical element blank by the direct press method or producing a glass material for press molding which is used in the precision press molding method.

Also, by way of lowering the temperature at which the molten glass is caused to be flow out, it is possible to inhibit occurrence of striae by volatilization, and to reduce a variation in the optical properties.

Further, by way of lowering the liquidus temperature, it is possible to inhibit a crucible where melting is performed from being corroded by the glass. As a result, it is possible to avoid that, substances such as platinum, etc., which constitute the crucible, are introduced into the glass by corrosion to be foreign substances, or dissolved as ions to cause the coloring of the glass.

Glass transition temperature is preferably 500° C. or more, from a viewpoint of the glass stability. On the other hand, from a viewpoint of obtaining good press moldability, glass transition temperature is preferably low, and for example, preferably 570° C. or less.

As described in the foregoing, the above-described optical glass is the glass which has the high refractive index and high dispersion characteristics, and which is preferable for any method of the direct press method, the reheat press method, and the precision press method.

<Aspect 2>

The following will describe Aspect 2.

An optical glass of Aspect 2 comprises the above-described Glass 2-A and 2-B. The following will describe the details thereof. Unless specifically described otherwise, the following description is applicable to both Glass 2-A and 2-B.

$P_2O_5$ is an inevitable component as a glass-forming component in phosphate-based glass. The phosphate-based glass is characterized in that it can be melted at a relatively low temperature and has a high transmittance in the visible range. From a viewpoint of an improvement in resistance to devitrification of the glass, the lower limit of content of $P_2O_5$ is 20% or more, and preferably 21% or more. Also, the upper limit thereof is 34% or less, preferably 30% or less, and more preferably 24% or less.

$B_2O_3$ is a component having the effect of increasing the resistance to devitrification by addition of an appropriate amount to the phosphate-based glass. For this reason, it is introduced over 0% as an essential component into the above-described optical glass. A content of $B_2O_3$ is preferably 2% or more, and more preferably 6% or more. Provided that it is contained in an excessive amount, it is difficult to realize the high refractive index and high dispersion characteristics, and therefore the content thereof is set to be 10% or less. The content thereof is preferably 9% or less, and more preferably 8% or less.

Here, "a content of $B_2O_3$ is 0%" comprises the case where a trace amount of $B_2O_3$ is contained in the order of a level of impurities in the glass. Therefore, "a content of $B_2O_3$ is over 0%" refers to the case where $B_2O_3$ is contained over the order of a level of impurities. Specifically, the content is, for example, 700 ppm or more (weight ratio), or 1000 ppm or more (weight ratio).

The content of each of $P_2O_5$ and $B_2O_3$ is the same as described previously. Further, for the above-described optical glass, a weight ratio of $P_2O_5$ content and $B_2O_3$ content ($B_2O_3/P_2O_5$) is set to over 0 but less than 0.39 in order to increase the resistance to devitrification of the phosphate-based optical glass with the high refractive index and high dispersion characteristics. More preferable lower limit thereof is 0.15, and much more preferable lower limit thereof is 0.25. More preferable upper limit thereof is 0.38. Also, in order to improve the resistance to devitrification, a weight ratio of a total content of $P_2O_5$ and $B_2O_3$, and a total content of $TiO_2$, $Nb_2O_5$, $WO_3$, $Bi_2O_3$ and $Ta_2O_5$ is defined. The details thereof will be described below.

$SiO_2$ is an optional component which may be contained in the above-described optical glass. From a viewpoint of increasing the refractive index, it is contained in an amount of preferably 2% or less, preferably 1.2% or less, and preferably 1.0% or less, and it may not be introduced at all (a content of $SiO_2$ may be 0%). Further, from a viewpoint of an improvement in the resistance to devitrification, in glass 2-B, weight ratio of a content of $SiO_2$ to a total content of $SiO_2$, $P_2O_5$ and $B_2O_3$ [$SiO_2/(SiO_2+P_2O_5+B_2O_3)$] is preferably less than 0.02, and preferably in the range of 0~0.01. From the same viewpoint, in glass 2-A, a weight ratio of a content of $SiO_2$ to a total content of $SiO_2$, $P_2O_5$ and $B_2O_3$ [$SiO_2/(SiO_2+P_2O_5+B_2O_3)$] is preferably less than 0.02, and more preferably in the range of 0~0.01.

The above-described optical glass can comprise one, or two or more alkali metal oxides. Here, the alkali metal oxides comprise $Li_2O$, $Na_2O$ and $K_2O$. However, from a viewpoint of an improvement in the resistance to devitrification, if $Li_2O$ is contained, the content thereof is set to be less than 0.3%. More preferably, the content thereof is 0.2% or less. From a viewpoint of a further improvement in the resistance to devitrification, it is preferable that $Li_2O$ be not contained (a content of $Li_2O$ be 0%).

At least one, preferably at least $Na_2O$, and more preferably both of $Na_2O$ and $K_2O$ of other alkali metal oxides can be added to the above-described glass. From a viewpoint of suppressing the lowering of refractive index, a weight ratio of $K_2O$ content to $Na_2O$ content $K_2O/Na_2O$ is preferably 0.52 or less, and more preferably 0.40 or less. Further, a weight ratio $K_2O/Na_2O$ can be 0.20 or more, for example.

Furthermore, for example, a content of $Na_2O$ can be 0% or more, preferably 8% or more, and more preferably 11% or more. A content of $K_2O$ can be 0% or more, preferably 2% or more, and more preferably 3% or more.

From a viewpoint of the resistance to devitrification, a content of $Na_2O$ in the above-described optical glass can be, for example, 16% or less, preferably 15% or less, and more preferably 14% or less. From the same viewpoint, a content of $K_2O$ is preferably 6% or less, and more preferably 5% or less.

A content of (a total content in case of containing a plurality of) alkali metal oxides is preferably 10% or more, and from a viewpoint of maintaining the resistance to devitrification, preferably 30% or less, and more preferably 20% or less. A preferable lower limit thereof is 15%.

$TiO_2$ is a component capable of imparting a high refractive index and high dispersion characteristics to the glass by addition of an appropriate amount, and is introduced as an essential component into the above-described optical glass. However, in order to maintain the high refractive index and high dispersion characteristics and the resistance to devitrification, the content thereof relative to contents of $Nb_2O_5$, $WO_3$, $Bi_2O_3$, $Ta_2O_5$ as other components capable of imparting the high refractive index and high dispersion characteristics is set to be an amount such that a weight ratio of $TiO_2$ content to a total content of $TiO_2$, $Nb_2O_5$, $WO_3$, $Bi_2O_3$, and $Ta_2O$ [$TiO_2/(TiO_2+Nb_2O_5+WO_3+Bi_2O_3+Ta_2O_5)$] is in the range of 0.059~0.96. If this weight ratio is below 0.059, it is difficult to obtain the high refractive index and high dispersion characteristics as described above, and if the weight ratio is above 0.96, it is difficult to maintain the resistance to devitrification. The weight ratio [$TiO_2/(TiO_2+Nb_2O_5+WO_3+Bi_2O_3+Ta_2O_5)$] is preferably 0.10 or more, and more preferably 0.12 or more, and it is preferably 0.50 or less, and more preferably 0.20 or less. From a viewpoint of the high refractive index and high dispersion characteristics, a content of $TiO_2$ is more preferably 6% or more. Further, from a viewpoint of maintaining the meltability of the glass and suppressing the coloring, it is preferably 11% or less, and more preferably 9% or less.

Also, in the above-described optical glass, from a viewpoint of improving the resistance to devitrification, a total content of $P_2O_5$ and $B_2O_3$, or a total content of $P_2O_5$, $B_2O_3$ and $SiO_2$ is defined relative to a total content of $TiO_2$, $Nb_2O_5$, $WO_3$, $Bi_2O_3$ and $Ta_2O_5$ as components imparting the high refractive index and high dispersion characteristics. More specifically, in glass A, a weight ratio [$(P_2O_5+B_2O_3)/(TiO_2+Nb_2O_5+WO_3+Bi_2O_3+Ta_2O_5)$] is set to be over 0.53. In glass B, a weight ratio [$(P_2O_5+B_2O_3+SiO_2)/(TiO_2+Nb_2O_5+WO_3+Bi_2O_3+Ta_2O_5)$] is set to be over 0.53. Further, from a viewpoint of maintaining the high refractive index and high dispersion characteristics, a weight ratio [$(P_2O_5+B_2O_3)/(TiO_2+Nb_2O_5+WO_3+Bi_2O_3+Ta_2O_5)$] is preferably 0.75 or less, and more preferably 0.58 or less. From the same viewpoint, a weight ratio [$(P_2O_5+B_2O_3+SiO_2)/(TiO_2+Nb_2O_5+WO_3+Bi_2O_3+Ta_2O_5)$] is preferably 0.75 or less, and more preferably 0.58 or less.

The total content of $TiO_2$, $Nb_2O_5$, $WO_3$, $Bi_2O_3$, and $Ta_2O_5$ as described above is preferably over 47%, and more preferably 50% or more, from a viewpoint of increasing the refractive index. Further, from a viewpoint of stability of the glass, a total content of $TiO_2$, $Nb_2O_5$, $WO_3$, $Bi_2O_3$, and $Ta_2O_5$ is preferably 60% or less, and more preferably 55% or less.

$Nb_2O_5$ is not only a component useful for obtaining the high refractive index and high dispersion characteristics, but also a component having the effect of increasing durability. From a viewpoint of maintaining the resistance to devitrification and suppressing the coloring, a content of $Nb_2O_5$ is preferably 47% or less. On the other hand, from a viewpoint of maintaining the high refractive index and high dispersion characteristics, a content of $Nb_2O_5$ is preferably 19% or more, more preferably 40% or more, and much more preferably 43% or more.

$WO_3$ and $Bi_2O_3$ are components which can be added in order to obtain the high refractive index and high dispersion characteristics. For example, each of a content of $WO_3$ and a content of $Bi_2O_3$ in the above-described optical glass can be set to be 15% or less. From a viewpoint of suppressing the coloring, each of the content of $WO_3$ and the content of $Bi_2O_3$ is set to preferably 12% or less, and preferably 6% or less and may be set to 0%. Further, the upper limit of $WO_3$ is preferably less than 3%, and more preferably 2% or less.

$Ta_2O_5$ is an optional component which can be added in order to adjust a refractive index. For example, the content thereof can be set to be in the range of 0~2%.

In the above-described optical glass, one, or two or more of alkali earth metal oxides MgO, CaO, SrO and BaO may be contained. For example, a total content of MgO, CaO, SrO and BaO is set to be in the range of 0~10%. Since alkali earth metal oxides are components having the effect of increasing the stability of the glass, but they may cause the lowering of refractive index or the lowering of dispersion, the total content thereof is preferably suppressed to 2% or less and may be 0%.

Further, for a content of each of alkali earth metal oxides, a preferable lower limit value of MgO content is 0% or more, and a preferable upper limit value thereof is 5% or less. A preferable lower limit value of a content of CaO is 0% or more, and a preferable upper limit value thereof is less than 1%. A preferable lower limit value of a content of SrO is 0% or more, and a preferable upper limit value thereof is 5% or less. A preferable lower limit value of a content of BaO is 0% or more, and a preferable upper limit value thereof is less than 7%, and more preferably 6% or less.

In the above-described optical glass, ZnO, and $Al_2O_3$ can be added as further optional components in order to adjust the refractive index. A content of ZnO can be preferably set to be less than 5%, and may be 0%. On the other hand, a content of $Al_2O_3$ is preferably set to be 2% or less, and may be 0%. Further, for example, each of components such as $La_2O_3$, $Y_2O_3$, $Gd_2O_3$, $Cs_2O$, $ZrO_2$, PbO, and the like may be added in an amount of 0~1% without hindering the object of the present invention. However, since PbO is a component which it is required to refrain from using in consideration of its effects on the environment, it is preferable that PbO be not introduced at all. Also, F may be added in an amount of 2% or less, based on the oxides. From a viewpoint of obtaining a homogeneous glass, it is preferable that F be not introduced. Further, $SnO_2$ and $Sb_2O_3$ may be added to the above-described optical glass, for example, in an amount of 0~1%, respectively, as a quantity added as a ratio of the content of $SnO_2$ and $Sb_2O_3$ to the total content other than $SnO_2$ and $Sb_2O_3$.

The foregoing has described the glass composition of the above-described optical glass. The following will describe the glass properties of the above-described optical glass.

The above-described optical glass is a high refractive index and high dispersion optical glass having a refractive index nd of 1.78~1.83, and an Abbe's number vd of 20~25. A lower limit of the refractive index nd is preferably 1.790 or more, and more preferably 1.800 or more, and an upper limit thereof is preferably less than 1.820, and more preferably 1.815 or less. A lower limit of the Abbe's number vd is preferably 21 or more, and more preferably 22 or more, and an upper limit thereof is preferably 24 or less, and more preferably 23 or less. The optical glass having the refractive index nd and the Abbe's number vd as described above is useful in optical systems.

The above-described optical glass is an optical glass having a high refractive index and high dispersion characteristics, which can exhibit the excellent resistance to devitrification. One of the indexes of the resistance to devitrification can be a liquidus temperature. The above-described optical glass can exhibit, for example, the liquidus temperature of 1050° C. or less, and can also exhibit the liquidus temperature of 1000° C. or less. Further, the lower limit of the liquidus temperature of the above-described optical glass is, for example, 900° C. or more, but is not specifically limited thereto.

Since glass with a low liquidus temperature has high stability against devitrification at around a softening point, crystals can be prevented from precipitating in the glass during heating for the reheat press, or heating in the precision press molding. Further, since glass with a low liquidus temperature can be caused to flow out at a low temperature, the temperature at which the molten glass is caused to flow out can be lowered. By way of lowering the temperature here, it is possible to prevent crystals from precipitating in the glass during producing an optical element blank by the direct press method or producing a glass material for press molding which is used in the precision press molding method.

Also, by way of lowering the temperature at which the molten glass is caused to flow out, it is possible to inhibit the occurrence of striae by volatilization, and also to reduce a variation in the optical properties.

Further, by way of lowering the liquidus temperature, it is possible to inhibit a crucible where melting is performed from being corroded by the glass. As a result, it is possible to avoid that, substances such as platinum, etc., which constitute the crucible, are introduced into the glass by corrosion to be foreign substance, or dissolved as ions to cause the coloring of the glass.

Glass transition temperature is preferably 500° C. or more, from a viewpoint of glass stability. On the other hand, from a viewpoint of obtaining good press moldability, the glass transition temperature is preferably low, and for example, preferably 570° C. or less.

As described above, the above-described optical glass is the glass which has the high refractive index and high dispersion characteristics, and which is preferable for any of the direct press method, the reheat press method, and the precision press method.

<Aspect 3>

The following will describe Aspect 3.

An optical glass of Aspect 3 is an optical glass comprising, in a glass composition based on oxides, 24~34 weight % of $P_2O_5$; over 0 weight % but 4 weight % or less of $B_2O_3$; 12~20 weight % of a total of $Na_2O$, $K_2O$, and $Li_2O$; 15~30 weight % of $Nb_2O_5$; 8~15 weight % of $TiO_2$; and 4~25 weight % of $Bi_2O_3$, wherein a weight ratio ($TiO_2$/$Nb_2O_5$) is in the range of 0.36~1.00, and a weight ratio ($Bi_2O_3$/$Nb_2O_5$) is in the range of 0.16~1.67, the optical glass having a refractive index nd of 1.78 or greater but less than 1.83, and an Abbe's number vd of 20~25.

The following will describe the details thereof.

$P_2O_5$ is an inevitable component as a glass-forming component in phosphate-based glass. Phosphate-based glass is characterized in that it can be dissolved at a relatively low temperature and has a high transmittance in the visible range. As compared to $SiO_2$ or $B_2O_3$ which is the same glass-forming component, $P_2O_5$ is positioned at the side of the high dispersion, and the content thereof is set to be 24% or more in order to obtain the high dispersion characteristics showing the above-described Abbe's number vd. The content thereof is set to be preferably 27% or more, and more preferably 28% or more. Provided that it is introduced in excess amount, the glass is likely to be devitrified, and therefore the content thereof is set to be 34% or less. The content thereof is set to be preferably 31% or less, and more preferably 30% or less.

$SiO_2$ is an optional component which can be added into the above-described optical glass, and has the effect of increasing the resistance to devitrification. From a viewpoint of obtaining the high refractive index characteristics, if the above-described optical glass contains $SiO_2$, the content of $SiO_2$ is preferably 1.2% or less. It is more preferably 1.0% or less, much more preferably less than 0.5%, still much more preferably 0.4% or less, and $SiO_2$ may not be introduced at all (the content of $SiO_2$ may be 0%).

$B_2O_3$ is a component having the effect of increasing the resistance to devitrification by addition of an appropriate amount to phosphate-based glass. For that purpose, it is introduced over 0% as an essential component into the above-described optical glass. A content of $B_2O_3$ is preferably 0.4% or more, and more preferably 0.7% or more. Provided that it is contained in an excessive amount, it is difficult to realize the high refractive index and high dispersion characteristics, and therefore the content thereof is set to be 4% or less. The content thereof is set to be preferably 3% or less, and more preferably 1.5% or less.

Here, "a content of $B_2O_3$ is 0%" comprises the case where a trace amount of $B_2O_3$ is contained in the order of a level of impurities in glass. Therefore, "a content of $B_2O_3$ is over 0%" refers to the case where $B_2O_3$ is contained over the order of a level of impurities. Specifically, the content is, for example, 700 ppm or more (weight ratio), or 1000 ppm or more (weight ratio).

The preferable properties that the glass which is preferable for precision press molding has can include a low glass transition temperature. This is because a mold release film formed on a mold itself or a molding surface of the mold gets damaged, if precision press molding temperature becomes higher, though it is necessary to set a press molding temperature to high temperature so as to press mold the glass having a high glass transition temperature Tg. In precision press molding method, an optical functional surface is formed by transferring a molding surface of a mold without machining such polishing, grinding, etc. Therefore, if the mold or the mold release film is damaged so that the molding surface is roughened, the shape of the roughened surface would be transferred to an optical element, thereby making it impossible to obtain an optical functional surface with high surface smoothness.

In view of the above, it is preferable that the above-described optical glass have a relatively low glass transition temperature, particularly a glass transition temperature of 520° C. or less. The glass transition temperature is more preferably 510° C. or less, much more preferably 500° C. or less, and still much more 490° C. or less. Also, from a viewpoint of glass stability, the glass transition temperature is preferably over 460° C., more preferably 465° C. or more, and much more preferably 470° C. or more.

In order to realize a low Tg which is preferable for the precision press molding as described above, a weight ratio of a $P_2O_5$ content and a $B_2O_3$ content ($B_2O_3/P_2O_5$) is preferably set to be over 0 but 0.1 or less. More preferably, it is over 0 but 0.083 or less.

Also, from a viewpoint of realizing the low glass transition temperature, in the above-described optical glass, a total content of alkali metal oxides $Na_2O$, $K_2O$, and $Li_2O$ is set to be 12% or more. On the other hand, the total content thereof is set to be 20% or less, from a viewpoint of maintaining the resistance to devitrification. The content thereof is set to be preferably 17% or less, and more preferably 16% or less.

The above-described optical glass can contain one, or two or more selected from the group consisting of $Li_2O$, $Na_2O$ and $K_2O$ as alkali metal oxides. For the alkali metal oxides, it is helpful in obtaining the optical glass exhibiting the low glass transition temperature to introduce at least $Na_2O$. From a viewpoint of lowering the glass transition temperature, a content of $Na_2O$ in the above-described optical glass is preferably set to be 2% or more, more preferably set to be 4% or more, and much more preferably set to be 5% or more. On the other hand, from a viewpoint of the resistance to devitrification, a content of $Na_2O$ is preferably set to be 12% or less, more preferably set to be 9% or less, and much more preferably set to be 8% or less.

Other alkali metal oxides $K_2O$ and $Li_2O$ all are also components which can be added in order to lower the glass transition temperature. A content of $K_2O$ in the above-described optical glass can be set to be 2% or more, for example, and is preferably 4% or more. A content of $Li_2O$ can be set to be 1% or more, for example, and is preferably 2% or more. Further, from a viewpoint of the resistance to devitrification, a content of $K_2O$ can be set to be 8% or less, for example, and is preferably 7% or less. A content of $Li_2O$ can be set to be 5% or less, for example, and is preferably 4% or less.

$Nb_2O_5$ is not only a component indispensable to obtaining high refractive index and high dispersion characteristics, but also a component having the effect of increasing the durability. If the content of $Nb_2O_5$ is less than 15%, it is difficult to obtain an intended high refractive index and high dispersion characteristics, and if it is over 30%, the devitrification resistance of glass is lowered. Therefore, in the above-described optical glass, the content of $Nb_2O_5$ is set to be in the range of 15~30%. From a viewpoint of realizing more preferable high refractive index and high dispersion characteristics, the content of $Nb_2O_5$ is preferably set to be 25% or less, more preferably set to be 22% or less, and much more preferably set to be 20% or less. Furthermore, from a viewpoint of the devitrification resistance, the content of $Nb_2O_5$ is preferably set to be 16% or more, and more preferably set to be 18% or more.

$TiO_2$ is a component capable of imparting the high refractive index and high dispersion characteristics to the glass by addition of an appropriate amount, and is introduced in an amount of 8% or more to the above-described optical glass. A content of $TiO_2$ is preferably 9% or more, and more preferably 10% or more. Provided that the content thereof is over 15%, the devitrification resistance is lowered, and therefore the content of $TiO_2$ in the above-described optical glass is set to be 15% or less. The content thereof is set to be preferably 13% or less, and more preferably 12% or less.

$Bi_2O_3$ is a component useful for lowering the glass transition temperature to improve the precision press molding. Therefore, $Bi_2O_3$ is introduced in an amount of 4% or more in the above-described optical glass. A content of $Bi_2O_3$ is preferably 6% or more, and more preferably 10% or more. Provided that it is introduced in excess amount, the devitrification resistance is lowered, and therefore the content of $Bi_2O_3$ in the above-described optical glass is set to be 25% or less. The content thereof is set to be preferably 20% or less, and more preferably 15% or less.

The content of each of $Nb_2O_5$, $TiO_2$, and $Bi_2O_3$ is the same as described previously. Also, in the above-described optical glass, the weight ratio ($TiO_2/Nb_2O_5$) is in the range of 0.36~1.00, and the weight ratio ($Bi_2O_3/Nb_2O_5$) is in the range of 0.16~1.67. The ratios of $Nb_2O_5$ and $TiO_2$ which are components useful for imparting the high refractive index and high dispersion characteristics, and $Bi_2O_3$ which is a component useful for improving the precision press moldability are set to be in the above-described ranges, so that the phosphate-based optical glass can be obtained, which is preferable for the precision press molding as well as having the high refractive index and high dispersion characteristics as a refractive index nd of 1.78 or greater but less than 1.83, and an Abbe's number vd of 20~25. From the prospective of achieving both the high refractive index and high dispersion characteristics and the precision press moldability, the lower limit of the weight ratio ($TiO_2/Nb_2O_5$) is preferably 0.40 or more, more preferably 0.50 or more, and much more preferably 0.55 or more. The upper limit thereof is preferably 0.80 or less, more preferably 0.70 or less, and much more preferably 0.60 or less. On the other hand, from the same viewpoint, the lower limit of the weight ratio ($Bi_2O_3/Nb_2O_5$) is preferably 0.20 or more, more preferably 0.40 or more, much more preferably 0.50 or more, and still much more preferably 0.60 or more. The upper limit thereof is preferably 0.87 or less, more preferably 0.80 or less, and much more preferably 0.70 or less.

In the above-described optical glass, one, or two or more of alkali earth metal oxides MgO, CaO, SrO and BaO may be contained. While alkali earth metal oxides are components having the effect of increasing the stability of the glass, they may cause the lowering of refractive index or the lowering of dispersion. Therefore, the total content of the alkali earth metal oxides MgO, CaO, SrO and BaO is preferably suppressed to be 2% or less, and also may be 0%.

The total content of the alkali metal oxides and the alkali earth metal oxides ($Li_2O+Na_2O+K_2O+MgO+CaO+SrO+BaO$) is preferably set to be in the range of 12~17%, from a viewpoint of realizing the high refractive index and high dispersion characteristics. The upper limit value thereof is more preferably 17% or less, and much more preferably 16% or less.

Further, for a content of each of the alkali earth metal oxides, a preferable lower limit value of MgO is 0% or more, and the preferable upper limit value thereof is 2% or less. A preferable lower limit value of a content of CaO is 0% or more, and a preferable upper limit value thereof is less than 2% or less, and more preferably less than 1%. A preferable lower limit value of a content of SrO is 0% or more, and a preferable upper limit value thereof is 2% or less. A preferable lower limit value of a content of BaO is 0% or more, and a preferable upper limit value thereof is 2% or less.

$WO_3$ is an optional component which can be added into the above-described glass, and it contributes to lowering Tg of the glass to have the effect of improving the precision press moldability. From a viewpoint of making the optical glass preferable for the precision press molding, 3% or more of $WO_3$ is preferably contained in the above-described optical glass. More preferably, the content thereof is 6% or more, and much more preferably 10% or more. On the other hand, from a viewpoint of the resistance to devitrification, the content of $WO_3$ is preferably set to be 23% or less, more preferably set to be 20% or less, and much more preferably set to be less than 13%.

From a viewpoint of lowering Tg of the glass, a ratio of the content of $WO_3$ to the content of $Nb_2O_5$ is preferably adjusted so that a weight ratio ($WO_3/Nb_2O_5$) may be in the range of 0.12~0.92. From the prospective of achieving both the high refractive index and high dispersion characteristics and the lowering of Tg, the lower limit value of the weight ratio ($WO_3/Nb_2O_5$) is more preferably 0.20, much more preferably 0.50, and still more preferably 0.55. The upper limit value thereof is more preferably 0.80, and much more preferably 0.70.

In the above-described optical glass, ZnO, $Al_2O_3$, or $Ta_2O_5$ may be added as a further optional component in order to adjust the refractive index. A content of each of ZnO, $Al_2O_3$ and $Ta_2O_5$ can be set to be, for example, in the range of 0~5%, and is preferably set to be in the range of 0~3%. Further, for example, each of components such as $La_2O_3$, $Y_2O_3$, $Gd_2O_3$, $Cs_2O$, $ZrO_2$, PbO, etc. may be added in an amount of 0~1% without hindering the object of the present invention. Further, $SnO_2$ and $Sb_2O_3$ may be added to the above-described optical glass, for example, in an amount of 0~1%, respectively, as a quantity added as a ratio of the content of $SnO_2$ and $Sb_2O_3$ to the total content other than $SnO_2$ and $Sb_2O_3$.

The foregoing has described the glass composition of the above-described optical glass. The following will describe the glass properties of the above-described optical glass.

The above-described optical glass is high refractive index and high dispersion optical glass having a refractive index nd of 1.78 or greater but less than 1.83, and an Abbe's number vd of 20~25. The lower limit value of the refractive index nd is preferably 1.790 or more, more preferably 1.795 or more, and much more preferably 1.800 or more. The upper limit value thereof is preferably 1.820 or less, more preferably 1.815 or less, and much more preferably 1.810 or less. The lower limit value of the Abbe's number vd is preferably 21.0 or more, and more preferably 22.0 or more. The upper limit value thereof is preferably 24.0 or less, and more preferably 23.5 or less. The optical glass having the refractive index nd and the Abbe's number vd as described above is useful in optical systems.

The high refractive index and high dispersion glass become more useful in the optical systems as it has the smaller Abbe's number vd in the same refractive index nd. In this regard, a preferable aspect of the above-described optical glass can include glass having the refractive index and Abbe's number vd satisfying the following formula (1).

$$nd \leq 15/vd + 1.18 \qquad (1)$$

By performing the composition adjustment as described previously, it is possible to obtain optical glass satisfying the formula (1) as well as having the refractive index nd and the Abbe's number vd in the above-described ranges.

As other glass physical properties, the glass transition temperature of the above-described optical glass is the same as described in the foregoing. An example of the effective composition in lowering of Tg can includes the composition below. While the Tg can be lowered simply by increasing the content of alkali metal oxides, or alkali earth metal oxides, etc. it may result in deteriorating weather resistance. On the other hand, a preferable composition allowing the lowering of Tg which is suitable for precision press molding, while maintaining the weather resistance, can include the following compositions.

(A) a composition wherein a total content of $Li_2O$, $Na_2O$, $K_2O$, MgO, CaO, SrO and BaO is in the range of 12~17%, and a weight ratio ($B_2O_3/P_2O_5$) is in the range of over 0 but 0.1 or less. Preferably, a composition wherein a total content of $Li_2O$, $Na_2O$, $K_2O$, MgO, CaO, SrO and BaO is in the range of 12~17%, and a weight ratio ($B_2O_3/P_2O_5$) is in the range of over 0 but 0.083 or less.

(B) a composition wherein a total content of $Li_2O$, $Na_2O$, $K_2O$, MgO, CaO, SrO and BaO is in the range of 12~17%, and a weight ratio ($Bi_2O_3/Nb_2O_5$) is in the range of 0.16~1.67. Preferably, a composition wherein a total content of $Li_2O$, $Na_2O$, $K_2O$, MgO, CaO, SrO and BaO is in the range of 12~17%, and a weight ratio ($Bi_2O_3/Nb_2O_5$) is in the range of 0.16~0.87.

(C) a composition wherein a total content of $Li_2O$, $Na_2O$, $K_2O$, MgO, CaO, SrO and BaO is in the range of 12~17%, and a weight ratio ($WO_3/Nb_2O_5$) is in the range of 0.12~0.92.

(D) a composition wherein a total content of $Li_2O$, $Na_2O$ and $K_2O$ is in the range of 12~20%, and a weight ratio ($WO_3/Nb_2O_5$) is in the range of 0.12~0.92.

(E) a composition wherein a total content of $Li_2O$, $Na_2O$, $K_2O$, MgO, CaO, SrO and BaO is in the range of 12~20%, and a weight ratio ($WO_3/Nb_2O_5$) is in the range of 0.12~0.92.

Further, an example of an effective composition for achieving the high dispersion characteristics and the lowering of Tg can include the following composition.

(F) a composition wherein a weight ratio ($TiO_2/Nb_2O_5$) is in the range of 0.36~1.00, and a total content of $Li_2O$, $Na_2O$, $K_2O$, MgO, CaO, SrO and BaO is in the range of 12~17%. Preferably, a composition wherein a weight ratio ($TiO_2/Nb_2O_5$) is in the range of 0.40~0.80, and a total content of $Li_2O$, $Na_2O$, $K_2O$, MgO, CaO, SrO and BaO is preferably in the range of 12~17%.

The glass properties that it is preferable for the optical glass to have in terms of precision press moldability can include low liquidus temperature. This is because the glass with the low liquidus temperature has high stability against devitrification at around a softening point, and therefore, by softening a preform under heat and precision-press molding the softened preform, it is possible to obtain an optical element with high transparency without devitrification. In this regard, the above-described optical glass preferably has a liquidus temperature of 1000° C. or less. The liquidus temperature is more preferably 970° C. or less, and much more preferably 960° C. or less. Further, from a viewpoint of glass stability, the liquidus temperature is preferably 850° C. or more, and more preferably 880° C. or more.

As described above, the above-described optical glass is optical glass with high refractive index and high dispersion characteristics, which is preferable for precision press molding.

Optical glass according to Aspects 1-3 all can be obtained by weighing and blending oxides, carbonates, sulfates, nitrates, hydroxides, etc., as raw materials so as to obtain an intended glass composition, fully mixing the blended raw materials to prepare a batch mixture, melting the batch mixture under heat in a melting vessel, carrying out defoaming and stirring to prepare a homogeneous and bubbles-free molten glass, and molding the molten glass. Specifically, it can be fabricated by using a known melting method.

[Optical Element Blank, Glass Material for Press Molding, and Methods for Producing Them]

<Aspect 1, Aspect 2>

Another aspect of the present invention relates to an optical element blank comprised of the optical glass according to Aspect 1 or 2;

a glass material for press molding, which is comprised of the optical glass according to Aspect 1 or 2;

a method for producing a glass material for press molding, comprising a step of molding the optical glass according to Aspect 1 or 2 into the glass material for press molding; and a method of producing an optical element blank, comprising a step of softening the above described glass material for press molding under heat and press molding the softened glass material with a press mold to fabricate an optical element blank.

The optical element blank refers to a basic material of an optical element which has a shape that is obtained by adding a processing margin to be removed by grinding and polishing to a shape of an intended optical element and that is similar to the shape of the optical element. An optical element is finished by polishing and grinding the surface of the optical element blank. An optical element blank can by fabricated by softening the glass material for press molding which is comprised of the above described optical glass under heat, and press molding the softened glass material using a press mold. Since the above-described optical glass can exhibit excellent resistance to devitrification, it is possible to prevent crystal from precipitating in glass by heating during the press molding.

Both heating and press molding the glass material for press molding can be carried out in the atmosphere. If a mold release agent in the form of a powder such as boron nitride is uniformly applied to the surface of the glass material for press molding, and then the glass material is heated and press-molded, it is possible not only to reliably prevent the fusion of the glass and the mold, but also to extend the glass smoothly along the molding surface of the press mold. Annealing after press molding is performed to reduce the strain within the glass, and thereby a homogeneous optical element blank can be obtained.

On the other hand, a glass material for press molding is also called as a preform, including those being employed without alteration in press molding, as well as being cut, ground, polished, or otherwise machined for press molding. For cutting method is used a method where a groove on a portion of the surface of the glass plate to be cut by a method called as "scribing" is formed and localized pressure is applied on the groove portion from the rear of the surface on which the groove has been formed to divide the glass plate at the groove portion; a method where the glass plate is cut by a cutting blade; or the like. Further, the grinding and polishing method can include barrel grinding, etc.

[Optical Element and Method for Producing the Same]

Another aspect of the present invention relates to an optical element comprised of the optical glass according to Aspect 1 or 2;

a method for producing an optical element, comprising a step of grinding and/or polishing the above described optical element blank to fabricate an optical element (hereinafter, referred to as "Method A");

a method of producing an optical element, comprising a step of softening the above described glass material for press molding under heat and press molding the softened glass material using a press mold to fabricate an optical element (hereinafter, referred to as "Method B").

In Method A, a known method may be applied for grinding and polishing, and an optical element with high internal quality and surface quality can be obtained by sufficiently cleaning and drying the optical element surface after the processing. The Method A is preferable as a method for producing an optical element such as various spherical lens, prism, etc.

In Method B, a precision press molding is also referred to as a mold optics molding, and is a method for forming an optical functional surface of an optical element by transferring a molding surface of a press mold. Herein, a surface transmitting, refracting, diffracting, or reflecting the light of an optical element is referred to as an optical functional surface. For example, to use a lens for an example, a lens surface such as an aspheric surface of an aspheric lens, a spherical surface of a spherical lens, etc. corresponds to an optical functional surface. A precision press molding method is a method where an optical functional surface is formed with press molding, by precisely transferring a molding surface of a press mold to glass. In summary, no additional machining such as grinding, polishing, etc. is needed in order to finish an optical functional surface. Precision press molding method is preferable for producing an optical element such as a lens, a lens array, a diffraction grating, a prism, etc. and is particularly optimal for a method for producing an aspheric lens with high productivity.

In an embodiment of precision press molding method, a preform with a clean surface is reheated so that glass constituting the preform exhibits a viscosity in the range of $10^5 \sim 10^{11}$ Pa·s, and the reheated preform is press molded by a mold equipped with an upper mold member and a lower mold member. On the molding surface of the mold, a mold release film may be formed, as necessary. Further, the press molding is preferably carried out in a nitrogen gas or inert gas atmosphere, in order to prevent the molding surface of the mold from being oxidized. A press molded product is taken out from the mold, and is gradually cooled as necessary. In the case where a molded product is an optical element such as a lens, etc. a surface thereof may be coated with an optical thin film as necessary.

Thus, it is possible to fabricate an optical element such as a lens, a lens array, a diffraction grating, a prism, etc., which is comprised of phosphate-based optical glass having a refractive index nd of 1.78-1.83, and an Abbe's number vd of 20-25, and being preferable for use in various molding methods.

<Aspect 3>

[Preform for Precision Press Molding]

Aspect 3 also relates to a preform for precision press molding, which is comprised of the above-described optical glass. A preform for precision press molding (hereinafter, also referred to as a preform) means a globe of glass provided for precision press molding, and is a molded glass body having weight corresponding that of precision press molded product. Further, the precision press molding is the same as described previously.

A preform may be fabricated by way of cold working such as grinding, polishing, etc. and may be fabricated by hot working where a molded product is obtained from molten glass without being subjected to the cold working such as grinding, polishing, etc. (hereinafter, also referred to as hot molding). In order to stably supply an aspheric lens using high functional glass on a large scale at low cost, a preform obtained by hot working is preferably precision-press molded. Glass properties suitable for this hot working can include low Tg, low liquidus temperature, etc. Since the above-described optical glass can have these glass properties, it is also a preferable glass for obtaining a preform by hot working.

According to an embodiment where a preform is fabricated by hot working, raw materials obtained from the above-described optical glass are molten, clarified, and stirred to obtain homogeneous molten glass. Then, by causing this molten glass to flow out of the pipe made of platinum or platinum alloy, a globe of glass is fabricated from a given amount of molten glass, and is used to mold a hot molded product. In the present embodiment, the molten glass is caused to flow continuously out of the outlet of the above-described pipe, and the leading end of glass which has flowed out of the outlet is separated to obtain a given amount of a globe of glass. The globe of glass obtained is molded into a preform shape while glass is in the temperature range where the glass can be plastically deformed. An example of a method for separating the leading end of the outflowing glass can include a dripping method and a descent-separation method. By using the above-described optical glass, the leading end of the glass which has flowed out of the pipe outlet can be separated without devitrifying the glass. An outflow speed and an outflow temperature are maintained to be constant, and a dripping condition or descent condition is maintained to be constant as well, so that a preform having a predetermined weight can be fabricated with good reproducibility and with high precision. According to the present embodiment, a preform with a weight of 1-5000 mg, for example, can be fabricated under high weight precision. According to the present embodiment, a preform with a weight of 1~5000 mg, for example, can be fabiricated under high weight precision.

In an embodiment, the separated leading end of glass is received with a mold emitting gas from a concave molding surface thereof, and then it is floated and rotated by wind pressure of the gas to be molded into a preform in the form of sphere, elliptical sphere, etc. Such molding method is referred to as float-molding method. Otherwise, a method where a molten globe of glass is press molded by a lower mold member and an upper mold member to obtain a preform is also known, and it can be used for the above-described hot molding. A hot-molded product thus obtained may have a known mold release film formed thereon, as necessary.

[Optical Element and Method for Producing the Same]

Another aspect of the present invention relates to an optical element comprised of the optical glass according to Aspect 3; and a method for producing an optical element, comprising a step of softening the above-described preform for precision press molding under heat and precision-press molding the soften preform using a press mold to fabricate an optical element.

The precision press molding method is the same as described previously. Since the above-described preform can have low Tg as glass property suitable for precision press molding, it can be pressed at a relatively low temperature for press molding of glass. Therefore, due to reduction of burden on the molding surface of the press mold, it is possible to increase the lifetime of the mold as well as to prevent the molding surface of the mold from roughening with damage.

An embodiment of the precision press molding method is the same as described previously. According to Aspect 3, it is possible to fabricate with the high precision and good productivity an optical element such as a lens, a lens array, a diffraction grating, a prism, etc. which is comprised of phosphate-based optical glass having a refractive index nd of 1.78 or greater but less than 1.83, and an Abbe's number vd of 20-25, and which is preferable for use in precision press molding.

EXAMPLES

The following will further describe the present invention based on examples. However, the present invention is not limited to the aspects represented in the examples.

1. Examples and Comparative Examples Relating to Optical Glass and a Preform for Precision Press Molding.

So as to obtain optical glass with the composition indicated in the tables below, 150. about. 300 g of raw materials of glass such as oxides, carbonates, sulfates, nitrates, hydroxides, etc. corresponding to each glass component, were weighed out in a predetermined proportion, and fully mixed to prepare a blend batch. This was put into a platinum crucible, and then was subjected to melting of glass for 2-4 hours in air while stirring at 1000-1250° C. After the melting, the molten glass was poured into 40×70×15 mm carbon mold, and allowed to cool to the glass transition temperature thereof, and then immediately put into an annealing furnace, and annealed in the glass transition temperature range for about 1 hour, and allowed to cool to room temperature within the furnace to fabricate each optical glass.

The refractive index, Abbe's number, glass transition temperature, and liquidus temperature of each optical glass were measured by the following method.

Measuring Method (1) Refractive Index (Nd) and Abbe's Number (Vd)

An optical glass obtained by gradually cooling at a temperature decrease ratio of −30° C./hour was subjected to the measurement.

(2) Glass Transition Temperature Tg

Measurement was conducted under conditions of a temperature increase ratio of 10° C./minute using Differential Scanning calorimetry (DSC).

(3) Liquidus Temperature LT

Glass sample was placed in test furnace set to an arbitrary temperature for 2 hours, and whether or not cyrstals were present was observed at 10~100× magnification with an optical microscope to measure the liquidus temperature.

(4) Devitrification Evaluation

Among the tables below, for the glass samples subjected to devitrification evaluation, the resistance to devitrification was evaluated by following method.

1 cm×1 cm glass samples were heated in a first test furnace set to glass transition temperature Tg of the glass for 10 minutes, and were additionally heated in a second test furnace set to Tg of the glass plus 10 r for 10 minutes, and then whether or not crystals or clouding was present was identified using an optical microscope (observation magnification: 10~100×). A case where neither crystals nor clouding was identified was decided as ○, and a case where at least one of crystals and clouding was identified was decided as x. In the present specification, the above-described evaluation results were used as index of the resistance to devitrification.

The measurement results are shown in the tables below.

Among the tables, Examples 1-1~1-28 are Examples of Aspect 1, and Comparative Examples 1-1 and 1-2 are Comparative Examples relative to Aspect 1. Examples 2-1~2-28 are Examples of Aspect 2, and Comparative Examples 2-1~2-3 are Comparative Examples relative to Aspect 2.

TABLE 1

| | SiO$_2$ | P$_2$O$_5$ | B$_2$O$_3$ | Li$_2$O | Na$_2$O | K$_2$O | MgO | CaO | BaO | ZnO | TiO$_2$ | Nb$_2$O$_5$ | WO$_3$ | Bi$_2$O$_3$ | Ta$_2$O$_5$ | Sb$_2$O$_3$ (as a quantity added as a ratio of the content of Sb$_2$O$_3$ to the total content other than Sb$_2$O$_3$) | B$_2$O$_3$/P$_2$O$_5$ | P$_2$O$_5$ + B$_2$O$_3$ + SiO$_2$ |
|---|---|---|---|---|---|---|---|---|---|---|---|---|---|---|---|---|---|---|
| Example 1-1 | 0.00 | 22.82 | 5.09 | 0.80 | 14.04 | 4.32 | 0.00 | 0.00 | 0.00 | 0.00 | 7.59 | 45.05 | 0.00 | 0.00 | 0.00 | 0.02 | 0.223 | 27.901 |
| Example 1-2 | 0.59 | 22.58 | 6.04 | 0.00 | 13.90 | 4.77 | 0.00 | 0.00 | 0.00 | 0.00 | 7.51 | 45.19 | 0.00 | 0.00 | 0.00 | 0 | 0.223 | 28.621 |
| Example 1-3 | 0.00 | 22.75 | 5.58 | 0.00 | 12.10 | 5.49 | 0.00 | 0.00 | 0.00 | 0.00 | 7.57 | 45.51 | 0.00 | 0.00 | 0.00 | 0.02 | 0.245 | 28.333 |
| Example 1-4 | 0.99 | 22.33 | 5.52 | 0.00 | 12.97 | 5.44 | 0.00 | 0.00 | 0.00 | 0.00 | 7.49 | 45.08 | 0.00 | 0.00 | 0.00 | 0 | 0.245 | 20.043 |
| Example 1-5 | 0.00 | 22.91 | 5.82 | 0.05 | 13.64 | 4.84 | 0.00 | 0.00 | 0.00 | 0.00 | 7.82 | 45.33 | 0.00 | 0.00 | 0.00 | 0.02 | 0.249 | 20.823 |
| Example 1-6 | 0.29 | 22.68 | 5.58 | 0.08 | 13.50 | 4.79 | 0.00 | 0.00 | 0.00 | 0.00 | 7.54 | 44.88 | 0.00 | 0.00 | 0.00 | 0 | 0.245 | 29.230 |
| Example 1-7 | 0.00 | 22.83 | 4.58 | 0.00 | 14.50 | 4.82 | 0.00 | 0.00 | 0.00 | 0.00 | 7.59 | 45.07 | 0.00 | 0.00 | 0.00 | 0.02 | 0.201 | 27.414 |
| Example 1-8 | 0.89 | 22.61 | 4.54 | 0.00 | 14.38 | 4.77 | 0.00 | 0.00 | 0.00 | 0.00 | 7.52 | 45.22 | 0.00 | 0.00 | 0.00 | 0 | 0.201 | 28.132 |
| Example 1-9 | 0.00 | 24.61 | 5.03 | 0.00 | 12.98 | 4.76 | 0.00 | 0.00 | 0.00 | 0.00 | 7.50 | 45.12 | 0.00 | 0.00 | 0.00 | 0.02 | 0.204 | 29.635 |
| Example 1-10 | 0.00 | 24.38 | 4.98 | 0.00 | 12.85 | 4.72 | 0.00 | 0.00 | 0.00 | 0.00 | 7.43 | 44.07 | 0.00 | 0.00 | 0.00 | 0 | 0.204 | 30.332 |
| Example 1-11 | 0.00 | 24.39 | 2.00 | 0.00 | 14.31 | 4.32 | 0.00 | 0.00 | 0.00 | 0.00 | 7.44 | 46.15 | 0.00 | 0.00 | 0.00 | 0.02 | 0.123 | 27.382 |
| Example 1-12 | 0.00 | 24.18 | 2.00 | 0.00 | 14.17 | 4.57 | 0.00 | 0.00 | 0.00 | 0.00 | 7.36 | 45.60 | 0.00 | 0.00 | 0.00 | 0 | 0.123 | 28.101 |
| Example 1-13 | 0.00 | 22.81 | 4.60 | 0.00 | 15.23 | 3.80 | 0.00 | 0.00 | 0.00 | 0.00 | 7.82 | 48.83 | 0.00 | 0.00 | 0.00 | 0.02 | 0.201 | 27.811 |
| Example 1-14 | 0.99 | 22.89 | 4.55 | 0.00 | 15.08 | 3.78 | 0.00 | 0.00 | 0.00 | 0.00 | 7.54 | 45.36 | 0.00 | 0.00 | 0.00 | 0 | 0.201 | 28.225 |
| Example 1-15 | 0.00 | 24.11 | 3.08 | 0.00 | 18.31 | 0.70 | 0.00 | 0.00 | 0.00 | 0.00 | 2.67 | 46.13 | 0.00 | 0.00 | 0.00 | 0.02 | 0.128 | 27.198 |
| Example 1-16 | 0.99 | 23.87 | 3.05 | 0.00 | 18.13 | 0.59 | 0.00 | 0.00 | 0.00 | 0.00 | 7.80 | 45.67 | 0.00 | 0.00 | 0.00 | 0 | 0.128 | 27.916 |
| Example 1-17 | 0.00 | 24.07 | 3.59 | 0.00 | 11.58 | 1.04 | 0.00 | 0.00 | 0.00 | 0.00 | 7.86 | 46.06 | 0.00 | 0.00 | 0.00 | 0.02 | 0.149 | 27.061 |

| | Na$_2$O + K$_2$O + Li$_2$O | (P$_2$O$_5$ + B$_2$O$_3$ + SiO$_2$)/(Na$_2$O + K$_2$O + Li$_2$O) | (P$_2$O$_5$ + B$_2$O$_3$ + SiO$_2$)/(SiO$_2$ + P$_2$O$_5$ + B$_2$O$_3$) | SiO$_2$/(Na$_2$O + K$_2$O + Li$_2$O) | Li$_2$O/(Na$_2$O + K$_2$O + Li$_2$O) | (P$_2$O$_5$ + B$_2$O$_3$ + SiO$_2$)/(TiO$_2$ + Nb$_2$O$_5$ + WO$_3$ + Bi$_2$O$_3$ + Ta$_2$O$_5$) | TiO$_2$/(TiO$_2$ + Nb$_2$O$_5$ + WO$_3$ + Bi$_2$O$_3$ + Ta$_2$O$_5$) | nd | νd | Tg (°C) | LT (°C) | Devitrification Evaluation |
|---|---|---|---|---|---|---|---|---|---|---|---|---|
| Example 1-1 | 18.858 | 1.480 | | 0.000 | 0.000 | 0.824 | 0.143 | 1.80785 | 22.76 | 545 | 980 | ○ |
| Example 1-2 | 18.672 | 1.533 | | 0.035 | 0.000 | 0.543 | 0.143 | 1.80351 | 22.95 | 849 | 950 | ○ |
| Example 1-3 | 18.567 | 1.524 | | 0.000 | 0.000 | 0.534 | 0.143 | 1.80802 | 22.65 | 544 | 930 | ○ |
| Example 1-4 | 18.403 | 1.578 | | 0.034 | 0.000 | 0.553 | 0.143 | 1.80368 | 22.91 | 648 | 950 | ○ |

TABLE 1-continued

| | Na₂O | K₂O | MgO | CaO | BaO | ZnO | TiO₂ | Nb₂O₅ | WO₃ | Bi₂O₃ | Ta₂O₂ | Sb₂O₃ (as a quantity added as a ratio of the content of Sb₂O₃ to the total content other than Sb₂O₃) | $n_d$ | $\nu_d$ | Tg | Ts | |
|---|---|---|---|---|---|---|---|---|---|---|---|---|---|---|---|---|---|
| Example 1-5 | 18.530 | 1.539 | 0.000 | 0.000 | | | 0.001 | | | 0.639 | 0.00 | 0.144 | 1.80721 | 22.74 | 542 | 950 | ○ |
| Example 1-6 | 18.346 | 1.593 | | 0.034 | | | 0.003 | | | 0.558 | | 0.144 | 1.80287 | 22.97 | 547 | 870 | ○ |
| Example 1-7 | 19.322 | 1.419 | 0.000 | 0.000 | | | 0.000 | | | 0.516 | | 0.143 | 1.80547 | 22.80 | 545 | 990 | ○ |
| Example 1-8 | 19.181 | 1.471 | | 0.035 | | | 0.000 | | | 0.533 | | 0.143 | 1.80213 | 22.03 | 549 | 980 | ○ |
| Example 1-9 | 17.745 | 1.670 | 0.000 | 0.000 | | | 0.000 | | | 0.563 | | 0.143 | 1.80582 | 22.73 | 686 | 950 | ○ |
| Example 1-10 | 17.870 | 1.726 | | 0.033 | | | 0.000 | | | 0.582 | | 0.143 | 1.80148 | 22.98 | 600 | 930 | ○ |
| Example 1-11 | 19.032 | 1.439 | 0.000 | 0.000 | | | 0.000 | | | 0.511 | | 0.103 | 1.80898 | 22.67 | 557 | 980 | ○ |
| Example 1-12 | 18.844 | 1.491 | | 0.035 | | | 0.000 | | | 0.530 | | 0.139 | 1.80464 | 22.00 | 901 | 980 | ○ |
| Example 1-13 | 19.036 | 1.445 | 0.000 | 0.000 | | | 0.000 | | | 0.815 | | 0.143 | 1.80781 | 22.77 | 543 | 960 | ○ |
| Example 1-14 | 18.843 | 1.498 | | 0.035 | | | 0.000 | | | 0.933 | | 0.143 | 1.80347 | 23.00 | 547 | 670 | ○ |
| Example 1-15 | 19.004 | 1.431 | 0.000 | 0.000 | | | 0.000 | | | 0.505 | | 1.143 | 1.80682 | 22.87 | 854 | 900 | ○ |
| Example 1-16 | 18.816 | 1.484 | | 0.000 | | | 0.000 | | | 0.524 | | 0.143 | 1.80243 | 23.10 | 568 | 980 | ○ |
| Example 1-17 | 18.633 | 1.485 | 0.000 | 0.000 | | | 0.000 | | | 0.515 | | 0.143 | 1.80795 | 22.80 | 555 | 940 | ○ |

| | SiO₂ | P₂O₅ | B₂O₃ | Li₂O | Na₂O | K₂O | MgO | CaO | BaO | ZnO | TiO₂ | Nb₂O₅ | WO₃ | Bi₂O₃ | Ta₂O₂ | Sb₂O₃ (as a quantity added as a ratio of the content of Sb₂O₃ to the total content other then Sb₂O₃) | B₂O₃/P₂O₅ | P₂O₅ + B₂O₃ + SiO₂ |
|---|---|---|---|---|---|---|---|---|---|---|---|---|---|---|---|---|---|---|
| Example 1-18 | 0.99 | 23.83 | 3.58 | 0.00 | 17.42 | 1.03 | 0.00 | 0.00 | 0.00 | 0.00 | 1.58 | 45.59 | 0.00 | 0.00 | 0.00 | 0 | 0.149 | 28.377 |
| Example 1-19 | 0.00 | 22.73 | 5.07 | 0.00 | 13.99 | 4.50 | 0.00 | 0.00 | 0.00 | 0.00 | 0.98 | 46.44 | 0.00 | 0.00 | 0.00 | 0.02 | 0.223 | 23.399 |
| Example 1-20 | 0.60 | 22.60 | 6.04 | 0.00 | 13.90 | 4.77 | 0.00 | 0.00 | 0.00 | 0.00 | 6.94 | 46.16 | 0.00 | 0.00 | 0.00 | 0 | 0.223 | 28.230 |
| Example 1-21 | 0.99 | 22.51 | 5.02 | 0.00 | 13.85 | 4.75 | 0.00 | 0.00 | 0.00 | 0.00 | 6.91 | 45.98 | 0.00 | 0.00 | 0.00 | 0 | 0.223 | 28.514 |
| Example 1-22 | 3.38 | 21.98 | 4.99 | 0.00 | 13.51 | 4.64 | 0.00 | 0.00 | 0.00 | 0.00 | 0.74 | 44.87 | 0.00 | 0.00 | 0.00 | 0 | 0.223 | 30.241 |

TABLE 1-continued

| Example | | | | | | | | | | | | | | | | |
|---|---|---|---|---|---|---|---|---|---|---|---|---|---|---|---|---|
| Example 1-23 | 0.00 | 22.82 | 4.83 | 0.00 | 14.61 | 4.30 | 0.00 | 0.00 | 0.00 | 7.30 | 46.14 | 0.00 | 0.00 | 0.02 | 0.212 | 27.856 |
| Example 1-24 | 0.99 | 22.68 | 4.70 | 0.00 | 14.48 | 4.26 | 0.00 | 0.00 | 0.00 | 7.23 | 45.68 | 0.00 | 0.00 | 0 | 0.212 | 26.372 |
| Example 1-25 | 0.00 | 24.16 | 0.61 | 0.00 | 17.66 | 1.05 | 0.00 | 0.00 | 0.00 | 8.28 | 45.25 | 0.00 | 0.00 | 0.02 | 0.149 | 27.789 |
| Example 1-26 | 0.99 | 23.92 | 4.57 | 0.00 | 17.49 | 1.04 | 0.00 | 0.00 | 0.00 | 8.20 | 44.80 | 0.00 | 0.00 | 0 | 0.149 | 28.435 |
| Example 1-27 | 0.00 | 23.01 | 0.10 | 0.00 | 13.12 | 4.81 | 0.00 | 0.00 | 0.00 | 7.35 | 45.61 | 0.00 | 0.00 | 0.02 | 0.285 | 29.107 |
| Example 1-28 | 0.99 | 22.78 | 6.04 | 0.00 | 12.99 | 4.77 | 0.00 | 0.00 | 0.00 | 7.28 | 45.16 | 0.00 | 0.00 | 0 | 0.285 | 25.809 |

| | $Na_2O + K_2O + Li_2O$ | $(P_2O_5 + B_2O_3 + SiO_2)/(Na_2O + K_2O + Li_2O)$ | $(P_2O_5 + B_2O_3 + SiO_2)/(SiO_2 + P_2O_5 + B_2O_3)$ | $SiO_2/(Na_2O + K_2O + Li_2O)$ | $Li_2O/(Na_2O + K_2O + Li_2O)$ | $(P_2O_5 + B_2O_3 + SiO_2)/(TiO_2 + Nb_2O_5 + WO_3 + Bi_2O_3 + Ta_2O_5)$ | $TiO_2/(TiO_2 + Nb_2O_5 + WO_3 + Bi_2O_3 + Ta_2O_5)$ | nd | vd | Tg (°C.) | LT (°C.) | Devitrification Evaluation |
|---|---|---|---|---|---|---|---|---|---|---|---|---|
| Example 1-18 | 18.449 | 1.638 | 0.036 | | 0.000 | 0.534 | 0.143 | 1.80361 | 23.03 | 359 | 960 | ○ |
| Example 1-19 | 18.786 | 1.480 | 0.000 | | 0.000 | 0.820 | 0.131 | 1.80904 | 22.73 | 544 | 940 | ○ |
| Example 1-20 | 18.674 | 1.512 | 0.021 | | 0.000 | 0.532 | 0.131 | 1.80665 | 22.63 | 543 | 940 | ○ |
| Example 1-21 | 18.600 | 1.633 | 0.035 | | 0.000 | 0.809 | 0.131 | 1.80470 | 22.96 | 548 | 960 | ○ |
| Example 1-22 | 18.150 | 1.656 | 0.112 | | 0.000 | 0.580 | 0.131 | 1.79411 | 23.53 | 554 | 980 | ○ |
| Example 1-23 | 18.910 | 1.462 | 0.000 | | 0.000 | 0.618 | 0.137 | 1.80920 | 22.72 | 540 | 960 | ○ |
| Example 1-24 | 18.723 | 1.515 | 0.035 | | 0.000 | 0.638 | 0.137 | 1.80486 | 22.95 | 850 | 970 | ○ |
| Example 1-25 | 18.706 | 1.485 | 0.000 | | 0.000 | 0.019 | 0.155 | 1.80930 | 22.66 | 555 | 940 | ○ |
| Example 1-26 | 18.621 | 1.638 | 0.035 | | 0.000 | 0.538 | 0.155 | 1.80490 | 22.89 | 559 | 960 | ○ |
| Example 1-27 | 17.937 | 1.623 | 0.000 | | 0.000 | 0.550 | 0.139 | 1.80952 | 22.60 | 540 | 950 | ○ |
| Example 1-28 | 17.760 | 1.678 | 0.033 | | 0.000 | 0.569 | 0.139 | 1.80518 | 22.83 | 550 | 970 | ○ |

TABLE 2

|  | SiO$_2$ | P$_2$O$_3$ | B$_2$O$_3$ | Li$_2$O | Na$_2$O | K$_2$O | MgO | CaO | BaO | ZnO | TiO$_2$ | Nb$_2$O$_5$ | WO$_3$ |
|---|---|---|---|---|---|---|---|---|---|---|---|---|---|
| Comparative Example 1-1 | 0.00 | 22.85 | 4.07 | 0.00 | 14.96 | 4.82 | 0.00 | 0.00 | 0.00 | 0.00 | 7.60 | 45.70 | 0.00 |
| Comparative Example 1-2 | 0.00 | 24.69 | 2.02 | 0.00 | 15.72 | 4.78 | 0.00 | 0.00 | 0.00 | 0.00 | 7.53 | 45.27 | 0.00 |

|  | Bi$_2$O$_3$ | Ta2O$_2$ | Sb$_2$O$_3$ (as a quantity added as a ratio of the content of Sb$_2$O$_3$ to the total content other then Sb$_2$O$_3$) | B$_2$O$_3$/P$_2$O$_3$ | P$_2$O$_3$ + B$_2$O$_3$ + SiO$_2$ |
|---|---|---|---|---|---|
| Comparative Example 1-1 | 0.00 | 0.00 | 0.02 | 0.178 | 26.920 |
| Comparative Example 1-2 | 0.00 | 0.00 | 0.02 | 0.082 | 25.706 |

|  | Na$_2$O + K$_2$O + Li$_2$O | (P$_2$O$_3$ + B$_2$O$_3$ + SiO$_2$)/(Na$_2$O + K$_2$O + Li$_2$O) | SiO$_2$/(SiO$_2$ + P$_2$O$_3$ + B$_2$O$_2$) | LiO$_2$/(Na$_2$O + K$_2$O + Li$_2$O) |
|---|---|---|---|---|
| Comparative Example 1-1 | 19.786 | 1.361 | 0.000 | 0.000 |
| Comparative Example 1-2 | 20.499 | 1.303 | 0.000 | 0.000 |

|  | (P$_2$O$_3$ + B$_2$O$_3$ + SiO$_2$)/(TiO$_2$ + Nb$_2$O$_3$ + WO$_3$ + Bi$_2$O$_3$ + Ta$_2$O$_3$) | TiO$_2$/(TiO$_3$ + Nb$_2$O$_3$ + WO$_3$ + Bi$_2$O$_3$ + Ta$_2$O$_3$) | nd | vd | Tg (°C.) | LT (°C.) | Devitrification Evaluation |
|---|---|---|---|---|---|---|---|
| Comparative Example 1-1 | 0.505 | 0.143 | 1.80492 |  | 542 |  | X |
| Comparative Example 1-2 | 0.506 | 0.143 | 1.80785 |  | 547 |  | X |

TABLE 3

(unit: Mass %)

|  | SiO$_2$ | P$_2$O$_3$ | B$_2$O$_3$ | Li$_2$O | Na$_2$O | K$_2$O | MgO | CaO | BaO | ZnO | TiO$_3$ | Nb$_2$O$_3$ | WO$_2$ | Bi$_3$O$_3$ | Ta$_2$O$_3$ | Sb$_2$O$_3$ (as a quantity added as a ratio of the content of Sb$_2$O$_3$ to the total content other than Sb$_2$O$_3$) |
|---|---|---|---|---|---|---|---|---|---|---|---|---|---|---|---|---|
| Example 2-1 | 0.00 | 29.99 | 0.23 | 0.00 | 8.31 | 10.11 | 0.00 | 0.00 | 0.00 | 0.00 | 8.57 | 42.79 | 0.00 | 0.00 | 0.00 | 0.06 |
| Example 2-2 | 0.00 | 31.90 | 0.25 | 0.00 | 12.38 | 5.38 | 0.00 | 0.00 | 0.00 | 0.00 | 15.96 | 34.14 | 0.00 | 0.00 | 0.00 | 0.06 |
| Example 2-3 | 0.00 | 32.39 | 0.25 | 0.00 | 12.67 | 5.46 | 0.00 | 0.00 | 0.00 | 0.00 | 18.52 | 30.61 | 0.00 | 0.00 | 0.00 | 0.06 |
| Example 2-4 | 0.00 | 32.90 | 0.26 | 0.00 | 12.77 | 5.64 | 0.00 | 0.00 | 0.00 | 0.00 | 21.16 | 27.38 | 0.00 | 0.00 | 0.00 | 0.06 |
| Example 2-5 | 0.00 | 33.42 | 0.26 | 0.00 | 12.97 | 5.63 | 0.00 | 0.00 | 0.00 | 0.00 | 23.86 | 23.84 | 0.00 | 0.00 | 0.00 | 0.06 |
| Example 2-6 | 0.00 | 27.81 | 0.91 | 0.00 | 12.55 | 4.92 | 0.00 | 0.00 | 0.00 | 0.00 | 10.43 | 19.09 | 12.11 | 12.17 | 0.00 | 0.06 |
| Example 2-7 | 0.00 | 28.29 | 0.93 | 0.00 | 11.63 | 5.01 | 0.00 | 0.00 | 0.00 | 0.00 | 7.43 | 40.62 | 0.00 | 6.19 | 0.00 | 0.06 |
| Example 2-8 | 0.00 | 27.40 | 1.92 | 0.00 | 11.96 | 5.20 | 0.00 | 0.00 | 0.00 | 0.00 | 7.71 | 46.81 | 0.00 | 0.00 | 0.00 | 0.06 |
| Example 2-9 | 0.00 | 28.30 | 0.93 | 0.00 | 11.63 | 5.01 | 0.00 | 0.00 | 0.00 | 0.00 | 7.43 | 40.63 | 6.16 | 0.00 | 0.00 | 0.06 |
| Example 2-10 | 0.00 | 26.07 | 2.95 | 0.00 | 12.70 | 5.32 | 0.00 | 0.00 | 0.00 | 0.00 | 7.90 | 45.06 | 0.00 | 0.00 | 0.00 | 0.06 |
| Example 2-11 | 0.00 | 22.83 | 6.11 | 0.00 | 12.69 | 5.61 | 0.00 | 0.00 | 0.00 | 0.00 | 8.18 | 44.69 | 0.00 | 0.00 | 0.00 | 0.06 |
| Example 2-12 | 0.00 | 24.49 | 4.00 | 0.00 | 13.14 | 5.42 | 0.00 | 0.00 | 0.00 | 0.00 | 8.04 | 44.91 | 0.00 | 0.00 | 0.00 | 0.06 |
| Example 2-13 | 0.00 | 23.58 | 5.03 | 0.00 | 12.76 | 5.44 | 0.00 | 0.00 | 0.00 | 0.00 | 8.08 | 45.12 | 0.00 | 0.00 | 0.00 | 0.06 |
| Example 2-14 | 0.00 | 22.06 | 7.21 | 0.00 | 12.61 | 5.68 | 0.00 | 0.00 | 0.00 | 0.00 | 8.28 | 44.26 | 0.00 | 0.00 | 0.00 | 0.06 |
| Example 2-15 | 0.00 | 22.65 | 6.06 | 0.00 | 12.69 | 5.47 | 0.00 | 0.00 | 0.00 | 0.00 | 6.95 | 46.28 | 0.00 | 0.00 | 0.00 | 0.06 |
| Example 2-16 | 0.00 | 22.50 | 6.02 | 0.00 | 12.60 | 5.43 | 0.00 | 0.00 | 0.00 | 0.00 | 8.06 | 42.13 | 0.00 | 3.36 | 0.00 | 0.06 |
| Example 2-17 | 0.00 | 22.45 | 6.66 | 0.00 | 12.65 | 5.64 | 0.00 | 0.00 | 0.00 | 0.00 | 8.23 | 44.48 | 0.00 | 0.00 | 0.00 | 0.06 |
| Example 2-18 | 0.00 | 23.27 | 6.22 | 0.00 | 16.62 | 0.00 | 0.00 | 0.00 | 0.00 | 0.00 | 8.33 | 45.55 | 0.00 | 0.00 | 0.00 | 0.06 |
| Example 2-19 | 0.00 | 22.88 | 6.12 | 0.22 | 12.26 | 5.52 | 0.00 | 0.00 | 0.00 | 0.00 | 8.19 | 44.80 | 0.00 | 0.00 | 0.00 | 0.06 |
| Example 2-20 | 1.96 | 22.38 | 5.99 | 0.00 | 12.44 | 5.40 | 0.00 | 0.00 | 0.00 | 0.00 | 8.02 | 43.82 | 0.00 | 0.00 | 0.00 | 0.06 |
| Example 2-21 | 3.85 | 21.95 | 5.87 | 0.00 | 12.20 | 5.30 | 0.00 | 0.00 | 0.00 | 0.00 | 7.86 | 42.97 | 0.00 | 0.00 | 0.00 | 0.06 |
| Example 2-22 | 0.00 | 21.54 | 5.76 | 0.00 | 11.97 | 5.20 | 0.00 | 0.00 | 5.86 | 0.00 | 7.71 | 42.16 | 0.00 | 0.00 | 0.00 | 0.06 |
| Example 2-23 | 0.00 | 22.66 | 6.06 | 0.00 | 12.59 | 5.47 | 0.00 | 0.74 | 0.00 | 0.00 | 8.11 | 44.36 | 0.00 | 0.00 | 0.00 | 0.06 |

TABLE 3-continued (unit: Mass %)

| | | | | | | | | | | | | | | | |
|---|---|---|---|---|---|---|---|---|---|---|---|---|---|---|---|
| Example 2-24 | 0.00 | 22.49 | 6.02 | 0.00 | 12.60 | 5.43 | 0.00 | 0.00 | 0.00 | 0.00 | 8.05 | 44.03 | 0.00 | 0.00 | 1.48 | 0.06 |
| Example 2-25 | 0.00 | 21.98 | 7.70 | 0.00 | 13.02 | 4.17 | 0.00 | 0.00 | 0.00 | 0.00 | 7.07 | 46.06 | 0.00 | 0.00 | 0.00 | 0.02 |
| Example 2-26 | 0.00 | 22.10 | 8.26 | 0.00 | 13.21 | 3.49 | 0.00 | 0.00 | 0.00 | 0.00 | 7.11 | 45.82 | 0.00 | 0.00 | 0.00 | 0.02 |
| Example 2-27 | 0.00 | 22.79 | 6.10 | 0.00 | 13.21 | 4.81 | 0.00 | 0.00 | 0.00 | 0.00 | 7.58 | 45.60 | 0.00 | 0.00 | 0.00 | 0.02 |
| Example 2-28 | 0.00 | 21.90 | 7.67 | 0.00 | 12.30 | 4.84 | 0.00 | 0.00 | 1.13 | 0.00 | 8.22 | 43.94 | 0.00 | 0.00 | 0.00 | 0.02 |

| | $B_2O_3/P_2O_3$ | $(P_2O_3 + B_2O_3)/(TiO_3 + Nb_2O_3 + WO_3 + Bi_2O_3 + Ta_2O_3)$ | $(P_2O_3 + B_2O_3 + SiO_3)/(TiO_3 + Nb_2O_3 + WO_3 + Bi_2O_3 + Ta_2O_3)$ | $TiO_2/(TiO_3 + Nb_2O_3 + WO_3 + Bi_2O_3 + Ta_2O_3)$ | $SiO_2/(SiO_2 + P_2O_3 + B_2O_3)$ | nd | vd | Tg (° C.) | LT (° C.) | Devitrification Evaluation |
|---|---|---|---|---|---|---|---|---|---|---|
| Example 2-1 | 0.008 | 0.588 | 0.568 | 0.167 | 0 | 1.79028 | 22.98 | 616 | 1040 | ○ |
| Example 2-2 | 0.008 | 0.642 | 0.642 | 0.319 | 0 | 1.80530 | 21.70 | 615 | 1020 | ○ |
| Example 2-3 | 0.008 | 0.662 | 0.662 | 0.375 | 0 | 1.80729 | 21.36 | 610 | 1060 | ○ |
| Example 2-4 | 0.008 | 0.683 | 0.663 | 0.436 | 0 | 1.80848 | 21.14 | 616 | 1060 | ○ |
| Example 2-5 | 0.008 | 0.708 | 0.708 | 0.500 | 0 | 1.80921 | 20.94 | 618 | 1060 | ○ |
| Example 2-6 | 0.033 | 0.534 | 0.534 | 0.194 | 0 | 1.78277 | 23.43 | 616 | 960 | ○ |
| Example 2-7 | 0.033 | 0.539 | 0.539 | 0.137 | 0 | 1.81034 | 22.64 | 673 | 1010 | ○ |
| Example 2-8 | 0.070 | 0.548 | 0.548 | 0.144 | 0 | 1.81297 | 22.41 | 680 | 1000 | ○ |
| Example 2-9 | 0.033 | 0.538 | 0.639 | 0.137 | 0 | 1.80162 | 22.78 | 687 | 1000 | ○ |
| Example 2-10 | 0.113 | 0.548 | 0.548 | 0.149 | 0 | 1.80800 | 22.61 | 689 | 970 | ○ |
| Example 2-11 | 0.268 | 0.547 | 0.547 | 0.155 | 0 | 1.80980 | 22.53 | 643 | 940 | ○ |
| Example 2-12 | 0.163 | 0.538 | 0.538 | 0.152 | 0 | 1.80788 | 22.65 | 654 | 960 | ○ |
| Example 2-13 | 0.213 | 0.538 | 0.538 | 0.152 | 0 | 1.81171 | 22.50 | 551 | 960 | ○ |
| Example 2-14 | 0.327 | 0.557 | 0.557 | 0.158 | 0 | 1.80753 | 22.59 | 533 | 940 | ○ |
| Example 2-15 | 0.268 | 0.539 | 0.539 | 0.131 | 0 | 1.80937 | 22.69 | 546 | 950 | ○ |
| Example 2-16 | 0.268 | 0.533 | 0.533 | 0.150 | 0 | 1.81063 | 22.62 | 533 | 940 | ○ |
| Example 2-17 | 0.297 | 0.552 | 0.552 | 0.155 | 0 | 1.80855 | 22.87 | 539 | 940 | ○ |
| Example 2-18 | 0.268 | 0.547 | 0.547 | 0.155 | 0 | 1.81682 | 22.32 | 552 | 960 | ○ |
| Example 2-19 | 0.268 | 0.547 | 0.547 | 0.155 | 0 | 1.81266 | 22.47 | 536 | 960 | ○ |
| Example 2-20 | 0.268 | 0.547 | 0.586 | 0.155 | 0.065 | 1.80101 | 22.96 | 550 | 940 | ○ |
| Example 2-21 | 0.268 | 0.547 | 0.823 | 0.155 | 0.121 | 1.79244 | 23.45 | 554 | 940 | ○ |
| Example 2-22 | 0.268 | 0.547 | 0.547 | 0.155 | 0 | 1.80591 | 23.42 | 539 | 980 | ○ |
| Example 2-23 | 0.268 | 0.547 | 0.547 | 0.155 | 0 | 1.80638 | 22.91 | 542 | 940 | ○ |
| Example 2-24 | 0.268 | 0.532 | 0.582 | 0.150 | 0 | 1.81262 | 22.50 | 549 | 970 | ○ |
| Example 2-25 | 0.350 | 0.559 | 0.559 | 0.133 | 0 | 1.81056 | 22.60 | 537 | 950 | ○ |
| Example 2-26 | 0.374 | 0.574 | 0.574 | 0.134 | 0 | 1.81014 | 22.61 | 541 | 940 | ○ |
| Example 2-27 | 0.268 | 0.543 | 0.543 | 0.143 | 0 | 1.81031 | 22.60 | 546 | 940 | ○ |
| Example 2-28 | 0.350 | 0.567 | 0.567 | 0.158 | 0 | 1.81086 | 22.64 | 537 | 940 | ○ |

TABLE 4

(unit: Mass %)

| | $SiO_2$ | $P_2O_3$ | $B_2O_3$ | $Li_2O$ | $Na_2O$ | $K_2O$ | MgO | CaO | BaO | ZnO | $TiO_2$ | $Nb_2O_3$ | $WO_3$ | $Bi_2O_3$ | $Ta_2O_3$ | $Sb_2O_3$ (as a quantity added as a ratio of the content of $Sb_2O_3$ to the total content other than $Sb_2O_3$) |
|---|---|---|---|---|---|---|---|---|---|---|---|---|---|---|---|---|
| Comparative Example 2-1 | 0.00 | 22.19 | 4.95 | 0.00 | 12.33 | 5.36 | 0.00 | 0.00 | 0.00 | 0.00 | 7.95 | 47.22 | 0.00 | 0.00 | 0.00 | 0.06 |
| Comparative Example 2-2 | 0.00 | 20.98 | 7.20 | 0.00 | 12.82 | 5.57 | 0.00 | 0.00 | 0.00 | 0.00 | 8.26 | 45.17 | 0.00 | 0.00 | 0.00 | 0.06 |
| Comparative Example 2-3 | 0.00 | 20.15 | 9.36 | 0.00 | 11.81 | 5.63 | 0.00 | 0.00 | 0.00 | 0.00 | 8.36 | 44.69 | 0.00 | 0.00 | 0.00 | 0.06 |

| | $B_2O_3/P_2O_3$ | $(P_2O_3 + B_2O_3)/(TiO_3 + Nb_2O_3 + WO_3 + Bi_2O_3 + Ta_2O_3)$ | $(P_2O_3 + B_2O_3 + SiO_3)/(TiO_3 + Nb_2O_3 + WO_3 + Bi_2O_3 + Ta_2O_3)$ | $TiO_2/(TiO_3 + Nb_2O_3 + WO_3 + Bi_2O_3 + Ta_2O_3)$ | $SiO_2/(SiO_2 + P_2O_3 + B_2O_3)$ | nd | vd | Tg (° C.) | LT (° C.) | Devitrification Evaluation |
|---|---|---|---|---|---|---|---|---|---|---|
| Comparative Example 2-1 | 0.223 | 0.492 | 0.492 | 0.144 | 0.000 | 1.82884 | 21.92 | 553 | 970 | X(Clouding) |
| Comparative Example 2-2 | 0.343 | 0.527 | 0.527 | 0.155 | 0.000 | 1.81386 | 22.45 | 533 | 960 | X(Clouding) |
| Comparative Example 2-3 | 0.465 | 0.556 | 0.556 | 0.158 | 0.000 | 1.81395 | 22.32 | 531 | | X(Clouding) |

TABLE 5

| | | Glass Composition | | | | | | | | | | | Sb₂O₃ (as a quantity added as a ratio of the content of Sb₂O₃ to the total content other than Sb₂O₃) | Mass Ratio | | | Total Content (Mass %) Na₂O + K₂O + Li₂O | Glass Properties | | | |
|---|---|---|---|---|---|---|---|---|---|---|---|---|---|---|---|---|---|---|---|---|
| | | P₂O₅ | B₂O₃ | Li₂O | Na₂O | K₂O | BaO | ZnO | TiO₂ | Nb₂O₅ | WO₃ | Bi₂O₃ | | TiO₂/Nb₂O₅ | Bi₂O₃/Nb₂O₅ | WO₃/Nb₂O₅ | B₂O₃/P₂O₅ | | nd | vd | Tg (°C.) | LT (°C.) |
| Example 3-1 | cnt % | 28 | 2 | 12 | 21 | 8 | 0 | 0 | 10 | 11 | 4 | 4 | | 0.55 | 0.64 | 0.53 | 0.04 | 18.34 | 1.80888 | 22.79 | 473 | 980 |
| | mol % | 24.58 | 1.75 | 10.53 | 18.42 | 7.02 | 0.00 | 0.00 | 17.54 | 9.65 | 7.02 | 3.51 | | | | | | | | | | |
| | wt % | 28.91 | 0.94 | 2.43 | 8.81 | 5.10 | 0.00 | 0.00 | 10.82 | 19.80 | 12.56 | 12.62 | | | | | | | | | | |
| Example 3-2 | cnt % | 30 | 2 | 12 | 19 | 6 | 0 | 0 | 10 | 11 | 4 | 4 | 0.06 | 0.55 | 0.64 | 0.53 | 0.03 | 15.34 | 1.80636 | 22.88 | 483 | 900 |
| | mol % | 26.32 | 1.75 | 10.53 | 16.87 | 7.02 | 0.00 | 0.00 | 17.54 | 9.55 | 7.02 | 3.51 | | | | | | | | | | |
| | wt % | 28.53 | 0.93 | 2.40 | 7.79 | 5.05 | 0.00 | 0.00 | 10.70 | 19.59 | 12.42 | 12.49 | | | | | | | | | | |
| Example 3-3 | cnt % | 30 | 4 | 12 | 17 | 8 | 0 | 0 | 10 | 11 | 4 | 4 | 0.06 | 0.55 | 0.64 | 0.53 | 0.07 | 14.49 | 1.80807 | 22.88 | 487 | 910 |
| | mol % | 26.32 | 3.51 | 10.53 | 14.91 | 7.02 | 0.00 | 0.00 | 17.54 | 9.65 | 7.02 | 3.51 | | | | | | | | | | |
| | wt % | 26.50 | 1.88 | 2.40 | 7.05 | 5.04 | 0.00 | 0.00 | 10.89 | 19.57 | 12.41 | 12.47 | | | | | | | | | | |
| Example 3-4 | cnt % | 30 | 6 | 12 | 15 | 8 | 0 | 0 | 10 | 11 | 4 | 4 | 0.06 | 0.55 | 0.84 | 0.63 | 0.10 | 13.65 | 1.80929 | 22.89 | 488 | 920 |
| | mol % | 25.32 | 5.28 | 10.53 | 13.18 | 7.02 | 0.00 | 0.00 | 17.54 | 9.85 | 7.02 | 3.51 | | | | | | | | | | |
| | wt % | 28.47 | 2.79 | 2.40 | 6.22 | 5.04 | 0.00 | 0.00 | 10.58 | 19.55 | 12.40 | 12.45 | | | | | | | | | | |
| Example 3-5 | cnt % | 30 | 2 | 18 | 13 | 8 | 0 | 0 | 10 | 11 | 4 | 4 | 0.06 | 0.55 | 0.64 | 0.63 | 0.03 | 14.23 | 1.81572 | 22.73 | 480 | 910 |
| | mol % | 26.32 | 1.75 | 15.79 | 11.40 | 7.02 | 0.00 | 0.00 | 17.54 | 9.65 | 7.02 | 3.51 | | | | | | | | | | |
| | wt % | 28.90 | 0.94 | 3.85 | 5.47 | 5.11 | 0.00 | 0.00 | 10.84 | 19.84 | 12.59 | 12.65 | | | | | | | | | | |
| Example 3-6 | cnt % | 30 | 2 | 12 | 19 | 8 | 0 | 0 | 11 | 10 | 4 | 4 | 0.06 | 0.68 | 0.70 | 0.70 | 0.03 | 15.45 | 1.80730 | 22.68 | 486 | 960 |
| | mol % | 26.09 | 1.74 | 10.43 | 16.52 | 6.98 | 0.00 | 0.00 | 19.13 | 8.70 | 6.98 | 3.48 | | | | | | | | | | |
| | wt % | 28.73 | 0.94 | 2.42 | 7.95 | 5.08 | 0.00 | 0.00 | 11.86 | 17.93 | 12.51 | 12.58 | | | | | | | | | | |
| Example 3-7 | cnt % | 30 | 1 | 12 | 20 | 8 | 0 | 0 | 10 | 11 | 4 | 4 | 0.06 | 0.55 | 0.64 | 0.63 | 0.02 | 15.78 | 1.80506 | 22.88 | 484 | 900 |
| | mol % | 26.32 | 0.88 | 10.53 | 17.54 | 7.02 | 0.00 | 0.00 | 17.54 | 9.65 | 7.02 | 3.51 | | | | | | | | | | |
| | wt % | 28.54 | 0.47 | 2.40 | 8.31 | 5.05 | 0.00 | 0.00 | 10.71 | 19.60 | 12.43 | 12.49 | | | | | | | | | | |
| Example 3-8 | cnt % | 30 | 3 | 12 | 18 | 8 | 0 | 0 | 10 | 11 | 4 | 4 | 0.06 | 0.55 | 0.84 | 0.83 | 0.05 | 14.92 | 1.80698 | 22.90 | 487 | 900 |
| | mol % | 26.32 | 2.63 | 10.53 | 15.79 | 7.02 | 0.00 | 0.00 | 17.54 | 9.65 | 7.02 | 3.51 | | | | | | | | | | |
| | wt % | 28.51 | 1.40 | 2.40 | 7.47 | 5.05 | 0.00 | 0.00 | 10.70 | 19.58 | 12.42 | 12.48 | | | | | | | | | | |
| Example 3-9 | cnt % | 30 | 2 | 12 | 19 | 8 | 0 | 2 | 10 | 8 | 4 | 4 | 0.06 | 0.87 | 0.78 | 0.78 | 0.03 | 15.55 | 1.79215 | 23.61 | 466 | 920 |
| | mol % | 25.86 | 1.72 | 10.34 | 16.38 | 6.90 | 0.00 | 3.45 | 17.24 | 7.76 | 6.90 | 3.45 | | | | | | | | | | |
| | wt % | 28.93 | 0.95 | 2.44 | 5.00 | 5.12 | 0.00 | 2.21 | 10.85 | 15.25 | 12.60 | 12.68 | | | | | | | | | | |
| Example 3-10 | cnt % | 30 | 2 | 16 | 15 | 8 | 0 | 0 | 10 | 11 | 4 | 4 | 0.06 | 0.55 | 0.84 | 0.63 | 0.03 | 14.80 | 1.81276 | 22.80 | 481 | 900 |
| | mol % | 26.32 | 1.75 | 14.04 | 13.16 | 7.02 | 0.00 | 0.00 | 17.54 | 9.65 | 7.02 | 3.51 | | | | | | | | | | |
| | wt % | 28.77 | 0.94 | 3.23 | 6.28 | 5.09 | 0.00 | 0.00 | 10.80 | 19.78 | 12.53 | 12.59 | | | | | | | | | | |
| Example 3-11 | cnt % | 30 | 2 | 20 | 11 | 8 | 0 | 0 | 10 | 11 | 4 | 4 | | 0.55 | 0.64 | 0.63 | 0.03 | 13.86 | 1.81855 | 22.70 | 479 | 930 |

TABLE 5-continued

| | | | | | | | | | Glass Composition | | | | | | | | | | |
|---|---|---|---|---|---|---|---|---|---|---|---|---|---|---|---|---|---|---|---|
| | | | | | | | | | | | | | | Sb$_2$O$_3$ (as a quantity added as a ratio of the content of Sb$_2$O$_3$ to the total content other than Sb$_2$O$_3$) | Mass Ratio | | | Total Content (Mass %) Na$_2$O + Li$_2$O + K$_2$O | Glass Properties | | |
| | | P$_2$O$_5$ | B$_2$O$_3$ | Li$_2$O | Na$_2$O | K$_2$O | BaO | ZnO | TiO$_2$ | Nb$_2$O$_5$ | WO$_3$ | Bi$_2$O$_3$ | | TiO$_2$/Nb$_2$O$_5$ | Bi$_2$O$_3$/Nb$_2$O$_5$ | WO$_2$/Nb$_2$O$_5$ | B$_2$O$_3$/P$_2$O$_5$ | | nd | vd | Tg (°C.) | LT (°C.) |
| Example 3-12 | mol % | 26.32 | 1.75 | 17.54 | 9.65 | 7.02 | 0.00 | 0.00 | 17.54 | 9.65 | 7.02 | 3.51 | | | | | | | | | | |
| | wt % | 29.03 | 0.95 | 4.07 | 4.65 | 5.14 | 0.00 | 0.00 | 10.89 | 19.93 | 12.64 | 12.70 | 0.06 | 0.60 | 0.70 | 0.70 | 0.03 | 14.29 | 1.81083 | 23.04 | 474 | 930 |
| Example 3-13 | mol % | 30 | 2 | 21 | 11 | 8 | 0 | 0 | 10 | 10 | 4 | 4 | | | | | | | | | | |
| | wt % | 26.32 | 1.75 | 18.42 | 9.65 | 7.02 | 0.00 | 0.00 | 17.54 | 8.77 | 7.02 | 3.51 | 0.06 | 0.50 | 0.70 | 0.70 | 0.03 | 13.96 | 1.81175 | 23.10 | 470 | 930 |
| | wt % | 29.50 | 0.98 | 4.35 | 4.72 | 5.22 | 0.00 | 0.00 | 11.07 | 18.41 | 12.85 | 12.91 | | | | | | | | | | |
| Example 3-14 | mol % | 30 | 2 | 20 | 11 | 8 | 0 | 1 | 10 | 10 | 4 | 4 | | | | | | | | | | |
| | wt % | 26.09 | 1.74 | 17.39 | 9.52 | 5.98 | 0.00 | 1.74 | 17.39 | 8.70 | 6.98 | 3.48 | 0.06 | 0.45 | 0.54 | 0.27 | 0.03 | 15.01 | 1.81527 | 22.72 | 488 | 930 |
| | wt % | 29.23 | 0.96 | 4.10 | 4.68 | 5.17 | 0.00 | 1.12 | 10.97 | 18.25 | 12.73 | 12.79 | | | | | | | | | | |
| Example 3-15 | mol % | 30 | 2 | 16 | 15 | 8 | 0 | 0 | 10 | 13 | 2 | 4 | | | | | | | | | | |
| | wt % | 28.79 | 1.79 | 14.29 | 13.39 | 7.14 | 0.00 | 0.00 | 17.86 | 11.61 | 3.57 | 3.57 | 0.06 | 0.40 | 0.47 | 0.00 | 0.03 | 15.43 | 1.81774 | 22.65 | 492 | 970 |
| | wt % | 29.57 | 0.97 | 3.32 | 6.45 | 5.23 | 0.00 | 0.00 | 11.09 | 23.99 | 6.44 | 12.94 | | | | | | | | | | |
| Example 3-16 | mol % | 30 | 2 | 16 | 15 | 8 | 0 | 0 | 10 | 13 | 0 | 4 | | | | | | | | | | |
| | wt % | 27.27 | 1.82 | 14.55 | 1364 | 7.27 | 0.00 | 0.00 | 18.18 | 13.64 | 0.00 | 3.64 | 0.06 | 0.46 | 0.27 | 0.54 | 0.03 | 15.01 | 1.80983 | 22.65 | 499 | 920 |
| | wt % | 30.40 | 0.99 | 3.41 | 6.54 | 5.38 | 0.00 | 0.00 | 11.41 | 28.48 | 0.00 | 13.31 | | | | | | | | | | |
| Example 3-17 | mol % | 30 | 2 | 16 | 15 | 8 | 0 | 0 | 10 | 11 | 4 | 2 | | | | | | | | | | |
| | wt % | 26.32 | 1.75 | 14.04 | 13.18 | 7.02 | 0.00 | 0.00 | 17.54 | 11.40 | 7.02 | 1.75 | 0.06 | 0.55 | 0.64 | 0.83 | 0.03 | 13.95 | 1.81509 | 22.78 | 478 | 940 |
| | wt % | 29.57 | 0.97 | 3.32 | 6.46 | 5.23 | 0.00 | 0.00 | 11.10 | 24.00 | 12.88 | 6.47 | | | | | | | | | | |
| Example 3-18 | mol % | 30 | 2 | 14 | 15 | 8 | 0 | 2 | 10 | 11 | 4 | 4 | | | | | | | | | | |
| | wt % | 25.88 | 1.72 | 12.07 | 12.93 | 6.90 | 0.00 | 3.45 | 17.24 | 9.48 | 6.90 | 3.45 | 0.06 | 0.60 | 0.67 | 0.58 | 0.03 | 14.66 | 1.81329 | 22.67 | 482 | 920 |
| | wt % | 28.27 | 0.92 | 2.78 | 6.17 | 5.00 | 0.00 | 2.16 | 10.81 | 19.41 | 12.31 | 12.37 | | | | | | | | | | |
| Example 3-19 | mol % | 30 | 2 | 18 | 15 | 8 | 0 | 0 | 10.5 | 10.5 | 4 | 4 | | | | | | | | | | |
| | wt % | 26.20 | 1.75 | 13.97 | 13.10 | 6.99 | 0.00 | 0.00 | 18.34 | 9.17 | 6.99 | 3.49 | 0.06 | 0.40 | 0.23 | 0.23 | 0.03 | 15.43 | 1.81193 | 22.58 | 501 | 950 |
| | wt % | 28.88 | 0.94 | 3.24 | 8.30 | 5.11 | 0.00 | 0.00 | 11.38 | 18.93 | 12.58 | 12.64 | | | | | | | | | | |
| | mol % | 30 | 2 | 18 | 15 | 8 | 0 | 0 | 10 | 15 | 2 | 2 | | | | | | | | | | |
| | wt % | 26.79 | 1.79 | 14.29 | 13.39 | 7.14 | 0.00 | 0.00 | 17.88 | 13.39 | 3.57 | 1.79 | 0.06 | | | | | | | | | |
| | wt % | 30.41 | 0.99 | 3.41 | 6.64 | 5.38 | 0.00 | 0.00 | 11.41 | 28.47 | 6.62 | 6.66 | | | | | | | | | | |

As Comparative Examples, optical glass was fabricated by the same method as the above-described Examples so that optical glass with the compositions of the examples 2, 3, 6 as described in laid open Japanese patent application No. H1994-345481 can be obtained, which has different glass composition from that of the optical glass according to an aspect of the present invention. As a result of carrying out the above-described devitrification evaluation for the optical glass fabricated, all the evaluation results were "x".

As further Comparative Examples, optical glass was fabricated by the same method as the above-described Examples so that optical glass with the composition of the example 10 as described in laid open Japanese patent application No. H5-270853 can be obtained, which has different glass composition from the optical glass according to an aspect of the present invention. As a result of carrying out the measurements of the refractive index and Abbe's number by the same method as the Examples for this optical glass fabricated, it was identified that nd was 1.76202, vd was 25.24 and it did not have the optical properties which the above-described optical glass satisfied.

As a result of carrying out the same evaluation for the example 4 as described in laid open Japanese patent application No. H1994-345481 as well, which has different composition from that of the optical glass of an aspect of the present invention, it was identified that nd was 1.72914, vd was 26.22, and it did not have the optical properties which the above-described optical glass satisfied.

Among the tables below, Examples 3-1~3-19 are Examples according to Aspect 3.

TABLE 5

| | | | | | | | | | | | | | | Sb$_2$O$_3$ (as a quantity added as a ratio of the content of Sb$_2$O$_3$ to the total content other than Sb$_2$O$_3$) |
|---|---|---|---|---|---|---|---|---|---|---|---|---|---|---|
| | | P$_2$O$_5$ | B$_2$O$_3$ | Li$_2$O | Na$_2$O | K$_2$O | BaO | ZnO | TiO$_2$ | Nb$_2$O$_5$ | WO$_3$ | Bi$_2$O3 | | |
| Example 3-1 | cnt % | 28 | 2 | 12 | 21 | 8 | 0 | 0 | 10 | 11 | 4 | 4 | | |
| | mol % | 24.56 | 1.72 | 10.53 | 18.42 | 7.02 | 0.00 | 0.00 | 17.54 | 9.65 | 7.02 | 3.51 | | |
| | wt % | 28.91 | 0.94 | 2.43 | 6.81 | 5.10 | 0.00 | 0.00 | 10.82 | 19.80 | 12.56 | 12.62 | | 0.006 |
| Example 3-2 | cnt % | 30 | 2 | 12 | 19 | 8 | 0 | 0 | 10 | 11 | 4 | 4 | | |
| | mol % | 36.32 | 1.75 | 10.53 | 16.67 | 7.02 | 0.00 | 0.00 | 17.54 | 9.65 | 7.02 | 3.51 | | |
| | wt % | 28.53 | 0.93 | 2.40 | 7.89 | 5.05 | 0.00 | 0.00 | 10.70 | 19.59 | 12.42 | 12.49 | | 0.006 |
| Example 3-3 | cnt % | 30 | 4 | 12 | 17 | 8 | 0 | 0 | 10 | 11 | 4 | 4 | | |
| | mol % | 26.32 | 3.51 | 10.53 | 14.91 | 7.02 | 0.00 | 0.00 | 17.54 | 9.65 | 7.02 | 3.51 | | |
| | wt % | 28.50 | 18.86 | 2.40 | 7.05 | 5.04 | 0.00 | 0.00 | 1069 | 19.57 | 12.41 | 12.47 | | 0.006 |
| Example 3-4 | cnt % | 30 | 6 | 12 | 15 | 8 | 0 | 0 | 10 | 11 | 4 | 4 | | |
| | mol % | 26.32 | 5.28 | 10.53 | 13.18 | 7.02 | 0.00 | 0.00 | 17.54 | 9.65 | 7.02 | 3.51 | | |
| | wt % | 28.47 | 2.79 | 2.40 | 6.22 | 5.04 | 0.00 | 0.00 | 10.68 | 19.55 | 12.40 | 12.46 | | 0.006 |
| Example 3-5 | cnt % | 30 | 2 | 18 | 13 | 8 | 0 | 0 | 10 | 11 | 4 | 4 | | |
| | mol % | 26.32 | 1.75 | 15.79 | 11.40 | 7.02 | 0.00 | 0.00 | 17.54 | 9.65 | 7.02 | 3.51 | | |
| | wt % | 28.90 | 0.94 | 3.65 | 5.47 | 5.11 | 0.00 | 0.00 | 10.84 | 19.84 | 12.59 | 12.65 | | 0.006 |
| Example 3-6 | cnt % | 30 | 2 | 12 | 19 | 8 | 0 | 0 | 11 | 10 | 4 | 4 | | |
| | mol % | 26.09 | 1.74 | 10.43 | 16.52 | 8.98 | 0.00 | 0.00 | 19.13 | 8.70 | 6.96 | .348 | | |
| | wt % | 28.73 | 0.94 | 2.42 | 7.95 | 5.08 | 0.00 | 0.00 | 11.86 | 17.93 | 12.51 | 12.58 | | 0.006 |
| Example 3-7 | cnt % | 30 | 1 | 12 | 20 | 8 | 0 | 0 | 10 | 11 | 4 | 4 | | |
| | mol % | 26.32 | 0.88 | 10.53 | 17.54 | 7.02 | 0.00 | 0.00 | 17.54 | 9.85 | 7.02 | 3.51 | | |
| | wt % | 28.54 | 0.47 | 2.40 | 8.31 | 5.05 | 0.00 | 0.00 | 10.71 | 19.60 | 12.43 | 12.49 | | 0.006 |
| Example 3-8 | cnt % | 30 | 3 | 12 | 18 | 8 | 0 | 0 | 10 | 11 | 4 | 4 | | |
| | mol % | 26.32 | 2.63 | 10.53 | 15.79 | 7.02 | 0.00 | 0.00 | 17.54 | 9.65 | 7.02 | 3.51 | | |
| | wt % | 28.51 | 1.40 | 2.40 | 7.47 | 5.05 | 0.00 | 0.00 | 10.70 | 19.58 | 12.42 | 12.48 | | 0.006 |
| Example 3-9 | cnt % | 30 | 2 | 12 | 19 | 8 | 0 | 2 | 10 | 9 | 4 | 4 | | |
| | mol % | 25.86 | 1.72 | 10.34 | 16.38 | 6.90 | 0.00 | 3.45 | 17.24 | 7.76 | 6.90 | 3.45 | | |
| | wt % | 28.93 | 0.95 | 2.44 | 8.00 | 5.12 | 0.00 | 2.21 | 10.85 | 16.25 | 12.60 | 1268 | | 0.006 |
| Example 3-10 | cnt % | 30 | 2 | 16 | 15 | 8 | 0 | 0 | 10 | 11 | 4 | 4 | | |
| | mol % | 26.32 | 1.75 | 14.04 | 13.16 | 7.02 | 0.00 | 0.00 | 17.54 | 9.65 | 7.02 | 3.51 | | |
| | wt % | 28.77 | 0.94 | 3.23 | 6.28 | 5.09 | 0.00 | 0.00 | 10.80 | 19.78 | 12.53 | 12.9 | | 0.006 |
| Example 3-11 | cnt % | 3 | 2 | 20 | 11 | 8 | 0 | 0 | 10 | 11 | 4 | 4 | | |
| | mol % | 26.32 | 1.75 | 17.54 | 9.65 | 7.02 | 0.00 | 0.00 | 17.54 | 9.65 | 7.02 | 3.81 | | |
| | wt % | 29.03 | 0.95 | 4.07 | 4.65 | 5.14 | 0.00 | 0.00 | 10.89 | 19.93 | 12.64 | 12.70 | | 0.006 |
| Example 3-12 | cnt % | 30 | 2 | 21 | 11 | 8 | 0 | 0 | 10 | 10 | 4 | 4 | | |
| | mol % | 26.32 | 1.75 | 18.42 | 9.65 | 7.02 | 0.00 | 0.00 | 17.54 | 8.77 | 7.02 | 3.81 | | |
| | wt % | 28.50 | 0.96 | 4.35 | 4.72 | 5.22 | 0.00 | 0.00 | 11.07 | 18.41 | 12.85 | 12.91 | | 0.006 |
| Example 3-13 | cnt % | 30 | 2 | 20 | 11 | 8 | 0 | 1 | 10 | 10 | 4 | 4 | | |
| | mol % | 26.09 | 1.74 | 17.39 | 9.57 | 6.96 | 0.00 | 1.74 | 17.39 | 8.70 | 6.96 | 3.48 | | |
| | wt % | 29.23 | 0.96 | 4.10 | 4.68 | 5.17 | 0.00 | 1.12 | 10.97 | 18.25 | 12.73 | 12.79 | | 0.006 |

TABLE 5-continued

| | | | | | | | | | | | | | |
|---|---|---|---|---|---|---|---|---|---|---|---|---|---|
| Example 3-14 | cnt % | 30 | 2 | 16 | 15 | 8 | 0 | 0 | 10 | 13 | 2 | 4 | |
| | mol % | 26.79 | 1.79 | 14.28 | 13.39 | 7.14 | 0.00 | 0.00 | 17.86 | 11.61 | 3.57 | 3.57 | |
| | wt % | 29.57 | 0.97 | 3.32 | 6.45 | 5.23 | 0.00 | 0.00 | 11.09 | 23.99 | 6.44 | 12.94 | 0.006 |
| Example 3-15 | cnt % | 30 | 2 | 16 | 15 | 8 | 0 | 0 | 10 | 15 | 0 | 4 | |
| | mol % | 27.27 | 1.82 | 14.55 | 13.64 | 7.27 | 0.00 | 0.00 | 18.18 | 13.64 | 0.00 | 3.64 | |
| | wt % | 30.40 | 0.99 | 3.41 | 6.64 | 5.38 | 0.00 | 0.00 | 11.41 | 18.48 | 0.00 | 13.31 | 0.006 |
| Example 3-16 | cnt % | 300 | 2 | 16 | 15 | 8 | 0 | 0 | 10 | 13 | 4 | 2 | |
| | mol % | 26.32 | 1.75 | 14.04 | 13.16 | 7.02 | 0.00 | 0.00 | 17.54 | 11.40 | 7.02 | 1.75 | |
| | wt % | 29.57 | 0.97 | 3.32 | 6.46 | 5.23 | 0.00 | 0.00 | 11.10 | 24.03 | 12.88 | 6.47 | 0.006 |
| Example 3-17 | cnt % | 30 | 2 | 14 | 15 | 8 | 0 | 2 | 10 | 11 | 4 | 4 | |
| | mol % | 25.86 | 1.72 | 12.07 | 12.93 | 6.90 | 0.00 | 3.45 | 17.24 | 9.48 | 6.90 | 3.45 | |
| | wt % | 28.27 | 0.92 | 2.78 | 6.17 | 5.00 | 0.00 | 2.16 | 10.51 | 19.41 | 12.31 | 12.37 | 0.006 |
| Example 3-18 | cnt % | 30 | 2 | 16 | 15 | 8 | 0 | 0 | 10.5 | 10.5 | 4 | 4 | |
| | mol % | 26.20 | 1.75 | 13.97 | 13.10 | 6.99 | 0.00 | 0.00 | 18.34 | 9.17 | 6.90 | 3.49 | |
| | wt % | 28.88 | 0.94 | 3.24 | 8.30 | 6.11 | 0.00 | 0.00 | 11.38 | 18.93 | 12.58 | 12.64 | 0.006 |
| Example 3-19 | cnt % | 30 | 2 | 16 | 15 | 8 | 0 | 0 | 10 | 15 | 2 | 2 | |
| | mol % | 26.79 | 1.79 | 14.29 | 13.39 | 7.14 | 0.00 | 0.00 | 17.86 | 13.39 | 3.57 | 1.79 | |
| | wt % | 30.41 | .99 | 3.41 | 6.64 | 5.38 | 0.00 | 0.00 | 11.41 | 28.47 | 6.62 | 6.66 | 0.006 |

| Mass Ratio | | | | Total Content (Mass %) $Li_2O +$ $Na_2O +$ $K_2O$ | Glass Properties | | | |
|---|---|---|---|---|---|---|---|---|
| $TiO_2/$ $Nb_2O_5$ | $Bi_2O3/$ $Nb_2O_5$ | $WO_3/$ $Nb_2O_5$ | $B_2O_3/$ $P_2O_5$ | | nd | vd | Tg (° C.) | Lt (° C.) |
| 0.55 | 0.64 | 0.63 | 0.04 | 16.34 | 1.80888 | 22.79 | 573 | 980 |
| 0.55 | 0.64 | 0.63 | 0.03 | 15.34 | 1.80636 | 22.88 | 483 | 900 |
| 0.55 | 0.64 | 0.63 | 0.07 | 14.49 | 1.80807 | 22.88 | 487 | 910 |
| 0.55 | 0.64 | 0.63 | 0.10 | 15.65 | 1.80929 | 22.89 | 488 | 920 |
| 0.65 | 0.64 | 0.63 | 0.03 | 14.23 | 1.81572 | 22.73 | 480 | 910 |
| 0.66 | 0.70 | 0.70 | 0.03 | 15.45 | 1.80730 | 22.68 | 486 | 960 |
| 0.55 | 0.64 | 0.63 | 0.02 | 15.76 | 1.80506 | 22.68 | 484 | 900 |
| 0.55 | 0.64 | 0.63 | 0.05 | 14.92 | 1.80698 | 22.90 | 487 | 900 |
| 0.67 | 0.78 | 0.78 | 0.03 | 15.55 | 1.79215 | 23.61 | 466 | 920 |
| 0.55 | 0.64 | 0.63 | 0.03 | 14.80 | 1.81276 | 22.80 | 81 | 900 |
| 0.53 | 0.64 | 0.63 | 0.03 | 13.86 | 1.81855 | 22.70 | 479 | 930 |
| 0.60 | 0.70 | 0.70 | 0.03 | 14.29 | 1.81083 | 23.04 | 474 | 930 |
| 0.80 | 0.70 | 0.70 | 0.03 | 13.96 | 1.81175 | 23.10 | 470 | 930 |
| 0.45 | 0.54 | 0.27 | 0.03 | 15.01 | 1.81527 | 22.72 | 488 | 930 |
| 0.40 | 0.47 | 0.00 | 0.03 | 15.43 | 1.81774 | 22.65 | 492 | 970 |
| 0.46 | 0.27 | 0.54 | 0.03 | 15.01 | 1.80983 | 22.65 | 499 | 920 |
| 0.55 | 0.84 | 0.63 | 0.03 | 13.95 | 1.81509 | 22.78 | 478 | 940 |
| 0.60 | 0.67 | 0.68 | 0.03 | 14.56 | 1.81329 | 22.67 | 482 | 920 |
| 0.40 | 0.23 | 0.23 | 0.03 | 15.43 | 1.81193 | 22.58 | 501 | 950 |

High quality and homogenized molten glass from which each optical glass of Examples according to Aspects 1 to 3 was obtained was caused to continuously flow out of a platinum alloy-made pipe. The molten glass flowing out was dripped from a pipe outlet, and was received by a plurality of preform molds in turn to mold a plurality of spheric preforms by float-molding method. In addition, a temperature of glass upon flowing out was set to a higher temperature than the liquidus temperature by several ° C.

Preforms obtained from the optical glass of Examples had no crystal which could be observed through a microscope, and they were transparent and also homogeneous. All these preforms obtained were not devitrified, and had high weight precision.

Preforms were fabricated from optical glass of Examples using a descent-separation method instead of a dripping method. Similarly, the devitrification was not observed even in preforms obtained by a descent-separation method, and preforms with high weight precision were obtained. Also, for all the dripping method and descent-separation method, a trace upon separation into a preform was not observed. Even if a platinum-made pipe is used, the pipe was never damaged by the outflowing of the molten glass, similarly to the platinum alloy-made pipe.

2. Examples Relating to an Optical Element

The above-described preforms had a surface coated as necessary, and were introduced into a press mold comprising upper, lower, and sleeve mold members made of SiC provided with a carbon mold release film on the molding surface thereof, and in a nitrogen atmosphere, the press mold and the preforms were heated together to soften the preform, and precision press molding was conducted to fabricate various lenses such as aspherical convex meniscus lenses, aspherical concave meniscus lenses, aspherical biconvex lenses, and aspherical biconcave lenses, which were comprised of various glass. Each condition of the precision press molding was adjusted within the ranges set forth above.

As a result of observing the various lenses thus fabricated, scratches, hazes, and damages on the surface of lenses were not observed at all.

While this process was repeatedly conducted to test weight production of the various lenses, no problems such as fusion of the glass and the pressing mold occurred, and it was possible to fabricate the lenses with both high-quality surfaces and interiors with high precision. The surface of the lenses obtained in this manner may be coated with an anti-reflective film.

Next, preforms identical to the above-described preforms were heated and softened, and they were then introduced into a separately preheated press mold and precision press molded to fabricate various lenses such as aspherical convex meniscus lenses, aspherical concave meniscus lenses, aspherical biconvex lenses, and aspherical biconcave lenses, which were comprised of the various glass. Each condition of the precision press molding was adjusted within the ranges set forth above.

As a result of observing various lenses thus fabricated, no clouding, etc. due to phase separation was not observed, and scratches, hazes, and damages on the surface of lenses were not observed at all.

While this process was repeatedly conducted to test weight production of the various lenses, no problems such as fusion of the glass and the pressing mold occurred, and it was possible to fabricate the lenses with both high-quality surfaces and interiors with high precision. The surface of the lenses obtained in this manner may be coated with an anti-reflective film.

The shape of the molding surface of the press mold may be suitably altered to fabricate various optical elements such as prisms, microlenses, lens arrays, etc.

3. Examples Relating to an Optical Element Blank and an Optical Element

The clarified and homogenized molten glass, from which each glass of Example according to the above-described Aspect 1 and Example according to the above-described Aspect 2 is obtained, is prepared, and the molten glass is caused to continuously flow out of a platinum-made pipe at a constant flow rate, and to flow into a mold having an opening in one side wall positioned horizontally under the pipe, and a molded glass plate was drawn from the opening of the mold, while being molded into glass plate with constant width and thickness. The drawn glass plate was subjected to annealing within an annealing furnace to reduce strain, and thus to obtain a glass plate comprised of each of the above-described optical glass which had no striae and foreign substance and had little coloring.

Next, each of these glass plates was cut vertically and horizontally to obtain a plurality of glass pieces in the form of a rectangular parallelepiped having the same dimension. Further, the plurality of glass pieces were subjected to barrel grinding, and were set to glass gob for press molding in weight for an intended press molded product.

Also, as an alternative to the above-described method, it is also possible to cause the molten glass to flow out of the platinum-made nozzle at a constant flow rate, to transfer the multiple receiving molds in turn under this nozzle to receive the molten glob of glass having a given weight in turn, to mold these molten globs of glass into the form of a sphere or a rotor, and then to perform annealing, followed by barrel grinding, to obtain a glass gob for press molding with weight adjusted to that of an intended press molded product.

A mold release agent in the form of powders such as boron nitride powders is applied to the entire surface of each glass gob as described above, softened under heat with a heater, and then introduced into a press mold provided with an upper mold member and a lower mold member, and pressed with the press mold to mold each lens blank which has a shape that is obtained by adding a processing margin to be removed by grinding and polishing to a shape of an intended lens and that is similar to the shape of the lens.

Subsequently, each lens blank is subjected to annealing to reduce strain. A cooled lens blank is subjected to grinding and polishing to be finished into an intended lens. Also, a series of processes were carried out in the atmosphere. All the respective lenses obtained had excellent light transparency. Optical multilayer films such as anti-reflective films may be coated on the lens as necessary.

By such lens, a good optical imaging system can be composed. Further, other optical elements such as prism, etc. can be fabricated by properly setting the shape of the press mold and the volume of the glass gob.

Finally, each of the above-described aspects will be summarized.

According to Aspect 1, an optical glass with high refractive index and high dispersion characteristics and with excellent resistance to devitrification, wherein, in a glass composition based on oxides, a content of $P_2O_5$ is in the range of 20~34 weight %; a content of $B_2O_3$ is over 0 weight % but 10 weight % or less; a weight ratio $(B_2O_3/P_2O_5)$ is over 0 but less than 0.39; a weight ratio $[TiO_2/(TiO_2+Nb_2O_5+WO_3+Bi_2O_3+Ta_2O_5)]$ is in the range of 0.059~0.180; and a weight ratio $[(P_2O_5+B_2O_3+SiO_2)/(Na_2O+K_2O+Li_2O)]$ is in the range of 1.39~1.80, the optical glass having a refractive index nd of 1.78~1.83, and an Abbe's number vd of 20~25, can be provided.

The optical glass of Aspect 1 can exhibit the liquidus temperature of 1050° C. or less by performing the previously-described composition adjustment.

From the prospective of achieving both more excellent resistance to devitrification and the high refractive index and high dispersion characteristics, the optical glass of Aspect 1 preferably satisfies one or more of the following glass compositions.

A weight ratio $[SiO_2/(SiO_2+P_2O_5+B_2O_3)]$ is 0.12 or less;

a content of $Li_2O$ is 0 weight % or more but less than 0.3 weight %;

a weight ratio $[Li_2O/(Na_2O+K_2O+Li_2O]$ is less than 0.0115;

a content of $Li_2O$ is 0 weight % or more but less than 0.3 weight %;

a weight ratio $[(P_2O_5+B_2O_3+SiO_2)/(TiO_2+Nb_2O_5+WO_3+Bi_2O_3+Ta_2O_5)]$ is 0.49 or more.

According to Aspect 2, in glass composition wherein $P_2O_5$, $B_2O_3$ and $TiO_2$ are essential components, and $SiO_2$, $Li_2O$, $Nb_2O_5$, $WO_3$, $Bi_2O_3$, and $Ta_2O_5$ are optional components, by setting the following:

a content of $P_2O_5$ to be in the range of 20~34 weight %, a content of $B_2O_3$ to be over 0 weight % but 10 weight % or less, a content of $Li_2O$ to be 0 weight % or more but less than 0.3 weight %, a weight ratio $(B_2O_3/P_2O_5)$ to be over 0 but less than 0.39, a weight ratio $[(P_2O_5+B_2O_3)/(TiO_2+Nb_2O_5+WO_3+Bi_2O_3+Ta_2O_5)]$ to be over 0.53, a weight ratio $[TiO_2/(TiO_2+Nb_2O_5+WO_3+Bi_2O_3+Ta_2O_5)]$ to be in the range of 0.059~0.96 (glass 2-A), or by setting the following:

a content of $P_2O_5$ to be in the range of 20~34 weight %, a content of $B_2O_3$ to be over 0 weight % but 10 weight % or less, a content of $Li_2O$ to be 0 weight % or more but less than 0.3 weight %, a weight ratio ($B_2O_3/P_2O_5$) to be over 0 but less than 0.39, a weight ratio $[(P_2O_5+B_2O_3+SiO_2)/(TiO_2+Nb_2O_5+WO_3+Bi_2O_3+Ta_2O_5)]$ to be over 0.53, a weight ratio $[SiO_2/(SiO_2+P_2O_5+B_2O_3)]$ to be less than 0.02, a weight ratio $[TiO_2/(TiO_2+Nb_2O_5+WO_3+Bi_2O_3+Ta_2O_5)]$ to be in the range of 0.059~0.96 (glass 2-B), the optical glass with high refractive index and high dispersion characteristics where a refractive index nd is in the range of 1.78~1.83, and an Abbe's number vd is in the range of 20~25 can be obtained.

In Aspect 2, by setting following:

a content of $P_2O_5$ to be in the range of 20~34 weight %, a content of $B_2O_3$ to be over 0 weight % but 10 weight % or less, a content of $Li_2O$ to be 0 weight % or more but less than 0.3 weight %, a weight ratio ($B_2O_3/P_2O_5$) to be over 0 but less than 0.39, a weight ratio $[(P_2O_5+B_2O_3+SiO_2)/(TiO_2+Nb_2O_5+WO_3+Bi_2O_3+Ta_2O_5)]$ to be 0.6 or more, a weight ratio $[TiO_2/(TiO_2+Nb_2O_5+WO_3+Bi_2O_3+Ta_2O_5)]$ to be in the range of 0.059~0.96 (glass 2-C), the optical glass with high refractive index and high dispersion characteristics where a refractive index nd is in the range of 1.78~1.83, and an Abbe's number vd is in the range of 20~25 can be obtained.

The above descriptions with respect to Glass 2-A and Glass 2-B can also be applied to details of Glass 2-C.

The optical glass of Aspect 2 can exhibit the liquidus temperature of 1050° C. or less by performing the previously-described composition adjustment.

From the prospective of achieving both more excellent resistance to devitrification and the high refractive index and high dispersion characteristics, Glass 2-A preferably has a weight ratio $[SiO_2/(SiO_2+P_2O_5+B_2O_3)]$ of less than 0.02.

From the prospective of achieving both more excellent resistance to devitrification and the high refractive index and high dispersion characteristics, the optical glass of Aspect 2 preferably satisfies one or more of the following glass compositions:

a content of $Nb_2O_5$ is in the range of 19~47 weight %;
a content of $TiO_2$ is in the range of 6~24 weight %;
a content of alkali metal oxide is in the range of 10~30 weight %;
a content of $Na_2O$ is in the range of 0~16 weight %;
a content of $K_2O$ is in the range of 0~6 weight %;
a content of $Bi_2O_3$ is in the range of 0~15 weight %;
a content of $WO_3$ is in the range of 0~15 weight %.

Since the optical glass according to Aspect 1 or 2 as described above can be suppressed from devitrifying in any of the direct press method, the reheat press method and the precision press method, it is preferable as glass for obtaining an optical element blank, a glass material for press molding, and an optical element.

That is, according to Aspect 1 or 2, an optical element blank, a glass material for press molding, and an optical element which are comprised of the optical glass of Aspect 1 or 2 are provided.

According to Aspect 1 or 2, a method for producing a glass material for press molding, comprising a step of molding the optical glass of Aspect 1 or 2 into the glass material for press molding, is provided.

Further, according to Aspect 1 or 2, a method of producing an optical element blank, comprising a step of softening the above described glass material for press molding under heat and press molding the softened glass material with a press mold to fabricate an optical element blank, is also provided.

Further, according to Aspect 1 or 2, a method of manufacturing an optical element, comprising a step of grinding and/or polishing the above-described optical element blank as described above to fabricate an optical element, is also provided.

Further, according to Aspect 1 or 2, a method of producing an optical element, comprising a step of softening the above described glass material for press molding under heat and press molding the softened glass material with a press mold to fabricate an optical element, is also provided.

Further, according to Aspect 3, in a glass composition with 24~34% of $P_2O_5$, over 0% but 4% or less of $B_2O_3$, 12~20% of a total of $Li_2O$, $Na_2O$ and $K_2O$, 15~30% of $Nb_2O_5$, 8~15% of $TiO_2$, 4~25 weight % of $Bi_2O_3$, by setting that a weight ratio ($TiO_2/Nb_2O_5$) is in the range of 0.36~1.00, and a weight ratio ($Bi_2O_3/Nb_2O_5$) is in the range of 0.16~1.67, the optical glass suitable for precision-ress molding having a high refractive index and high dispersion characteristics as a refractive index nd of 1.78 or greater but less than 1.83, and an Abbe's number vd of 20~25 can be obtained.

From a viewpoint of realizing more preferable high refractive index and high dispersion characteristics, the optical glass of Aspect 3 preferably comprise 12~17% of a total of $Li_2O$, $Na_2O$, $K_2O$, MgO, CaO, SrO and BaO.

From a viewpoint of realizing a glass transition temperature suitable for precision press molding, the optical glass of Aspect 3 preferably has a weight ratio ($B_2O_3/P_2O_5$) of over 0 but 0.1 or less. From the same viewpoint, the weight ratio ($WO_3/Nb_2O_5$) is preferably in the range of 0.12~0.92, and the content of $WO_2$ is also preferably in the range of 3~23 weight %.

From a viewpoint of realizing the more preferable high refractive index and high dispersion characteristics, the content of CaO is preferably less than 1 weight %, and the content of the total of MgO, CaO, SrO, and BaO is also preferably less than 2 weight %.

By performing the above-described composition adjustment, the optical glass of Aspect 3 can have a suitable transition temperature Tg of 520° C. or less for precision press molding.

Since the optical glass of Aspect 3 has glass properties such as a low Tg suitable for precision press molding, it is preferable as glass for obtaining a preform for precision press molding, and an optical element obtained by precision-press molding this preform.

That is, according to Aspect 3, a preform for precision press molding, and an optical element, which is comprised of the optical glass of Aspect 3 are provided.

Further, according to Aspect 3, a method of producing an optical element, comprising a step of softening the above-described preform for precision press molding under heat and precision-press molding the softened preform with a press mold to fabricate an optical element, is also provided.

It should be considered that the embodiments disclosed herein are illustrative in all respects, and is not intended to be in limiting. It is intended that the scope of the present invention is represented not by the above description but by the following claims, and all the modifications falling within the meaning and scope equivalent to the claims are included therein.

For example, for the exemplary glass composition as described above, the composition adjustment as described in specification can be carried out to obtain an optical glass of an aspect of the present invention.

Further, any two or more of the items described as exemplary or preferred range in the specification can be combined.

INDUSTRIAL APPLICABILITY

The present invention is useful in the field of manufacturing various optical elements such as glass lenses, lens arrays, diffraction gratings, prisms, etc.

What is claimed is:

1. Optical glass, wherein, in a glass composition based on oxides,
   a content of $P_2O_5$ is in the range of 20-34 weight %;
   a content of $B_2O_3$ is over 0 weight % but 10 weight % or less;
   a content of $Al_2O_3$ is less than 3 weight %;
   a weight ratio ($B_2O_3/P_2O_5$) is over 0 but less than 0.39;
   a weight ratio [$TiO_2/(TiO_2+Nb_2O_5+WO_3+Bi_2O_3+Ta_2O_5)$] is in the range of 0.10-0.180; and
   a weight ratio [$(P_2O_5+B_2O_3+SiO_2)/(Na_2O+K_2O+Li_2O)$] is in the range of 1.39-1.80,
   the optical glass having a refractive index nd of 1.78-1.83, and an Abbe's number vd of 20-25.

2. The optical glass of claim 1, wherein a weight ratio [$SiO_2/(SiO_2+P_2O_5+B_2O_3)$] is 0.12 or less.

3. The optical glass according to claim 1, wherein a content of $Li_2O$ is 0 weight % or more but less than 0.3 weight %.

4. The optical glass according to claim 1, wherein a weight ratio [$Li_2O/(Na_2O+K_2O+Li_2O)$] is less than 0.0115.

5. The optical glass according to claim 1, wherein a weight ratio [$(P_2O_5+B_2O_3+SiO_2)/(TiO_2+Nb_2O_5+WO_3+Bi_2O_3+Ta_2O_5)$] is 0.49 or more.

6. The optical glass according to claim 1, wherein it has a liquidus temperature of 1050° C. or less.

7. An optical element blank which is comprised of the optical glass according to claim 1.

8. A method of manufacturing an optical element, comprising a step of grinding and/or polishing the optical element blank of claim 7 to fabricate an optical element.

9. A glass material for press molding, which is comprised of the optical glass according to claim 1.

10. A method of producing an optical element blank, comprising a step of press molding the glass material for press molding of claim 9 with a press mold to fabricate an optical element blank.

11. A method of producing an optical element, comprising a step of: press molding the glass material for press molding of claim 9 with a press mold to fabricate an optical element.

12. An optical element which is comprised of the optical glass according to claim 1.

13. A method for producing a glass material for press molding, comprising a step of molding the optical glass according to claim 1 into a glass material for press molding.

14. Optical glass, wherein, in a glass composition based on oxides,
   $P_2O_5$, $B_2O_3$ and $TiO_2$ are essential components, and $SiO_2$, $Li_2O$, $Nb_2O_5$, $WO_3$, $Bi_2O_3$, and $Ta_2O_5$ are optional components;
   a content of $P_2O_5$ is in the range of 20-34 weight %;
   a content of $B_2O_3$ is over 0 weight % but 10 weight % or less;
   a content of $Li_2O$ is 0 weight % or more but less than 0.3 weight %;
   a content of $Al_2O_3$ is 2 weight % or less;
   a weight ratio ($B_2O_3/P_2O_5$) is over 0 but less than 0.39;
   a weight ratio [$(P_2O_5+B_2O_3)/(TiO_2+Nb_2O_5+WO_3+Bi_2O_3+Ta_2O_5)$] is over 0.53; and
   a weight ratio [$TiO_2/(TiO_2+Nb_2O_5+WO_3+Bi_2O_3+Ta_2O_5)$] is in the range of 0.059-0.96,
   the optical glass having a refractive index nd of 1.78-1.83, and an Abbe's number vd of 20-25.

15. The optical glass of claim 14, wherein a weight ratio [$SiO_2/(SiO_2+P_2O_5+B_2O_3)$] is less than 0.02.

16. The optical glass according to claim 14, wherein it has a liquidus temperature of 1050° C. or less.

17. The optical glass according to claim 14, wherein a content of $Nb_2O_5$ is in the range of 19-47 weight %.

18. The optical glass according to claim 14, wherein a content of $TiO_2$ is in the range of 6-24 weight %.

19. The optical glass according to claim 14, wherein a content of alkali metal oxide is in the range of 10-30 weight %.

20. The optical glass according to claim 14, wherein a content of $Na_2O$ is in the range of 0-16 weight %, and a content of $K_2O$ is in the range of 0-6 weight %.

21. The optical glass according to claim 14, wherein a content of $Bi_2O_3$ is in the range of 0-15 weight %.

22. The optical glass according to claim 14, wherein a content of $WO_3$ is in the range of 0-15 weight %.

23. Optical glass, wherein, in a glass composition based on oxides,
   $P_2O_5$, $B_2O_3$ and $TiO_2$ are essential components, and $SiO_2$, $Li_2O$, $Nb_2O_5$, $WO_3$, $Bi_2O_3$, and $Ta_2O_5$ are optional components;
   a content of $P_2O_5$ is in the range of 20-34 weight %;
   a content of $B_2O_3$ is over 0 weight % but 10 weight % or less;
   a content of $Li_2O$ is 0 weight % or more but less than 0.3 weight %;
   a content of $Al_2O_3$ is 2 weight % or less;
   a weight ratio ($B_2O_3/P_2O_5$) is over 0 but less than 0.39;
   a weight ratio [$(P_2O_5+B_2O_3+SiO_2)/(TiO_2+Nb_2O_5+WO_3+Bi_2O_3+Ta_2O_5)$] is over 0.53;
   a weight ratio [$SiO_2/(SiO_2+P_2O_5+B_2O_3)$] is less than 0.02; and
   a weight ratio [$TiO_2/(TiO_2+Nb_2O_5+WO_3+Bi_2O_3+Ta_2O_5)$] is in the range of 0.059-0.96,
   the optical glass having a refractive index nd of 1.78-1.83, and an Abbe's number vd of 20-25.

24. Optical glass comprising, in a glass composition based on oxides, 24-34 weight % of $P_2O_5$;
  over 0 weight % but 4 weight % or less of $B_2O_3$;
  12-20 weight % of a total of $Li_2O$, $Na_2O$ and $K_2O$;
  15-30 weight % of $Nb_2O_5$;
  8-15 weight % of $TiO_2$; and,
  4-25 weight % of $Bi_2O_3$,
  wherein a weight ratio ($TiO_2/Nb_2O_5$) is in the range of 0.36-1.00, and a weight ratio ($Bi_2O_3/Nb_2O_5$) is in the range of 0.16-1.67,
  the optical glass having a refractive index nd of 1.78 or greater but less than 1.83, and an Abbe's number vd of 20-25.

25. The optical glass of claim 24, wherein a total content of $Li_2O$, $Na_2O$, $K_2O$, MgO, CaO, SrO and BaO is in the range of 12-17 weight %.

26. The optical glass according to claim 24, wherein a weight ratio ($B_2O_3/P_2O_5$) is in the range of over 0 but 0.1 or less.

27. The optical glass according to claim 24, wherein a weight ratio ($WO_3/Nb_2O_5$) is in the range of 0.12-0.92.

28. The optical glass according to claim 24, wherein a content of $WO_3$ is in the range of 3-23 weight %.

29. The optical glass according to claim 24, wherein a content of CaO is less than 1 weight %.

30. The optical glass according to claim 24, wherein a total content of MgO, CaO, SrO, and BaO is less than 2 weight %.

31. The optical glass according to claim 24, wherein it has a glass transition temperature Tg of 520° C. or less.

32. A preform for precision press molding, which is comprised of the optical glass according to claim 24.

33. A method for producing an optical element, comprising a step of: softening the preform for precision press molding of claim 32 under heat and precision-press molding the soften preform with a press mold to fabricate an optical element.

34. An optical element which is comprised of the optical glass according to claim 24.

* * * * *